(12) United States Patent
Fernando et al.

(10) Patent No.: US 11,115,375 B2
(45) Date of Patent: *Sep. 7, 2021

(54) INTEROPERABILITY BETWEEN DATA PLANE LEARNING ENDPOINTS AND CONTROL PLANE LEARNING ENDPOINTS IN OVERLAY NETWORKS

(71) Applicant: Cisco Technology, Inc., San Jose, CA (US)

(72) Inventors: Rex Emmauel Fernando, Fremont, CA (US); Victor Manuel Moreno, Carlsbad, CA (US); Shyam Kapadia, San Jose, CA (US); Liqin Dong, San Jose, CA (US); Murali Venkateshaiah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/577,330

(22) Filed: Sep. 20, 2019

(65) Prior Publication Data

US 2020/0021555 A1 Jan. 16, 2020

Related U.S. Application Data

(63) Continuation of application No. 15/143,202, filed on Apr. 29, 2016, now Pat. No. 10,454,877.

(51) Int. Cl.
*H04L 29/12* (2006.01)
*H04L 12/46* (2006.01)
*H04L 12/24* (2006.01)

(52) U.S. Cl.
CPC ........ *H04L 61/103* (2013.01); *H04L 12/4633* (2013.01); *H04L 41/0806* (2013.01); *H04L 41/12* (2013.01); *H04L 61/6022* (2013.01)

(58) Field of Classification Search
CPC ............... H04L 61/103; H04L 61/6022; H04L 12/4633; H04L 41/12; H04L 41/0806
(Continued)

(56) References Cited

U.S. PATENT DOCUMENTS 5,185,848 A 2/1993 Aritsuka et al.
5,917,537 A 6/1999 Lightfoot et al.
(Continued)

FOREIGN PATENT DOCUMENTS

CN 102004671 3/2013

OTHER PUBLICATIONS

Akkaya, Kemal, et al., "A survey on routing protocols for wireless sensor networks" Abtract, 1 page, Ad Hoc Networks, May 2005.
(Continued)

*Primary Examiner* — James E Springer
(74) *Attorney, Agent, or Firm* — Polsinelli

(57) ABSTRACT

A system and a method are disclosed for enabling interoperability between data plane learning endpoints and control plane learning endpoints in an overlay network environment. An exemplary method for managing network traffic in the overlay network environment includes receiving network packets in an overlay network from data plane learning endpoints and control plane learning endpoints, wherein the overlay network extends Layer 2 network traffic over a Layer 3 network; operating in a data plane learning mode when a network packet is received from a data plane learning endpoint; and operating in a control plane learning mode when the network packet is received from a control plane learning endpoint. Where the overlay network includes more than one overlay segment, the method further includes operating as an anchor node for routing inter-overlay segment traffic to and from hosts that operate behind the data plane learning endpoints.

20 Claims, 5 Drawing Sheets

(58) Field of Classification Search
USPC .................................................... 709/223
See application file for complete search history.

(56) References Cited

U.S. PATENT DOCUMENTS

| | | |
|---|---|---|
| 5,970,064 A | 10/1999 | Clark et al. |
| 6,023,606 A | 2/2000 | Monte et al. |
| 6,115,393 A | 9/2000 | Engel et al. |
| 6,298,351 B1 | 10/2001 | Castelli et al. |
| 6,456,624 B1 | 9/2002 | Eccles et al. |
| 6,597,684 B1 | 7/2003 | Gulati et al. |
| 6,697,325 B1 | 2/2004 | Cain |
| 6,721,899 B1 | 4/2004 | Narvaez-Guarnieri et al. |
| 6,816,464 B1 | 11/2004 | Scott et al. |
| 6,894,714 B2 | 5/2005 | Gutta, Sr. et al. |
| 6,954,617 B2 | 10/2005 | daCosta |
| 7,185,077 B1 | 2/2007 | O'Toole et al. |
| 7,453,864 B2 | 11/2008 | Kennedy et al. |
| 7,496,650 B1 | 2/2009 | Previdi et al. |
| 7,826,372 B1 | 11/2010 | Mabe et al. |
| 7,826,400 B2 | 11/2010 | Sackauchi |
| 7,848,340 B2 | 12/2010 | Sackauchi et al. |
| 7,995,464 B1 | 8/2011 | Croak et al. |
| 8,059,557 B1 | 11/2011 | Sigg et al. |
| 8,063,929 B2 | 11/2011 | Kurtz et al. |
| 8,154,583 B2 | 4/2012 | Kurtz et al. |
| 8,274,893 B2 | 9/2012 | Bansal et al. |
| 8,385,355 B1 | 2/2013 | Figueira et al. |
| 8,489,765 B2 | 7/2013 | Vasseur et al. |
| 8,620,840 B2 | 12/2013 | Newnham et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 8,707,194 B1 | 4/2014 | Jenkins et al. |
| 8,767,716 B2 | 7/2014 | Trabelsi et al. |
| 8,774,164 B2 | 7/2014 | Klein et al. |
| 8,842,161 B2 | 9/2014 | Feng et al. |
| 8,856,584 B2 | 10/2014 | Matsubara |
| 8,862,522 B1 | 10/2014 | Jaiswal et al. |
| 8,880,477 B2 | 11/2014 | Barker et al. |
| 8,942,085 B1 | 1/2015 | Pani et al. |
| 8,948,054 B2 | 2/2015 | Kreeger et al. |
| 8,982,707 B2 | 3/2015 | Moreno et al. |
| 9,324,022 B2 | 4/2016 | Williams, Jr. et al. |
| 9,338,065 B2 | 5/2016 | Vasseur et al. |
| 9,338,084 B2 | 5/2016 | Badoni |
| 9,374,294 B1 | 6/2016 | Pani |
| 9,553,799 B2 | 1/2017 | Tarricone et al. |
| 9,558,451 B2 | 1/2017 | Nilsson et al. |
| 9,596,099 B2 | 3/2017 | Yang et al. |
| 9,614,756 B2 | 4/2017 | Joshi |
| 2002/0061001 A1 | 5/2002 | Garcia-Luna-Aceves et al. |
| 2002/0101505 A1 | 8/2002 | Gutta et al. |
| 2002/0105904 A1 | 8/2002 | Hauser et al. |
| 2002/0116154 A1 | 8/2002 | Nowak et al. |
| 2002/0159386 A1 | 10/2002 | Grosdidier et al. |
| 2003/0005149 A1 | 1/2003 | Haas et al. |
| 2003/0061340 A1 | 3/2003 | Sun et al. |
| 2003/0067912 A1 | 4/2003 | Mead et al. |
| 2003/0091052 A1 | 5/2003 | Pate et al. |
| 2003/0117992 A1 | 6/2003 | Kim et al. |
| 2003/0133417 A1 | 7/2003 | Badt, Jr. |
| 2003/0187800 A1 | 10/2003 | Moore et al. |
| 2003/0225549 A1 | 12/2003 | Shay et al. |
| 2004/0153563 A1 | 8/2004 | Shay et al. |
| 2004/0218525 A1 | 11/2004 | Elie-Dit-Cosaque et al. |
| 2005/0111487 A1 | 5/2005 | Matta et al. |
| 2005/0114532 A1 | 5/2005 | Chess et al. |
| 2005/0143979 A1 | 6/2005 | Lee et al. |
| 2005/0286711 A1 | 12/2005 | Lee et al. |
| 2006/0072471 A1 | 4/2006 | Shiozawa |
| 2006/0083193 A1 | 4/2006 | Womack et al. |
| 2006/0116146 A1 | 6/2006 | Herrod et al. |
| 2006/0133404 A1 | 6/2006 | Zuniga et al. |
| 2006/0274647 A1 | 12/2006 | Wang et al. |
| 2007/0047707 A1 | 3/2007 | Mayer et al. |
| 2007/0071030 A1 | 3/2007 | Lee |
| 2007/0083650 A1 | 4/2007 | Collomb et al. |
| 2007/0120966 A1 | 5/2007 | Murai |
| 2007/0149249 A1 | 6/2007 | Chen et al. |
| 2007/0192065 A1 | 8/2007 | Riggs et al. |
| 2007/0208590 A1 | 9/2007 | Dorricott et al. |
| 2008/0049622 A1 | 2/2008 | Previdi et al. |
| 2008/0089246 A1 | 4/2008 | Ghanwani et al. |
| 2008/0140817 A1 | 6/2008 | Agarwal et al. |
| 2008/0159151 A1 | 7/2008 | Datz et al. |
| 2008/0181259 A1 | 7/2008 | Andreev et al. |
| 2008/0192651 A1 | 8/2008 | Gibbings |
| 2008/0293353 A1 | 11/2008 | Mody et al. |
| 2009/0003232 A1 | 1/2009 | Vaswani et al. |
| 2009/0010264 A1 | 1/2009 | Zhang |
| 2009/0073988 A1 | 3/2009 | Ghodrat et al. |
| 2009/0129316 A1 | 5/2009 | Ramanathan et al. |
| 2009/0147714 A1 | 6/2009 | Jain et al. |
| 2009/0147737 A1 | 6/2009 | Tacconi et al. |
| 2009/0168653 A1 | 7/2009 | St. Pierre et al. |
| 2009/0271467 A1 | 10/2009 | Boers et al. |
| 2009/0303908 A1 | 12/2009 | Deb et al. |
| 2010/0046504 A1 | 2/2010 | Hill |
| 2010/0165863 A1 | 7/2010 | Nakata |
| 2011/0082596 A1 | 4/2011 | Meagher et al. |
| 2011/0116389 A1 | 5/2011 | Tao et al. |
| 2011/0149759 A1 | 6/2011 | Jollota |
| 2011/0228696 A1 | 9/2011 | Agarwal et al. |
| 2011/0255570 A1 | 10/2011 | Fujiwara |
| 2011/0267962 A1 | 11/2011 | Suganya et al. |
| 2011/0274283 A1 | 11/2011 | Athanas |
| 2011/0317699 A1 | 12/2011 | Assarpour |
| 2012/0009890 A1 | 1/2012 | Curcio et al. |
| 2012/0075999 A1 | 3/2012 | Ko et al. |
| 2012/0163177 A1 | 6/2012 | Vaswani et al. |
| 2012/0192075 A1 | 7/2012 | Ebtekar et al. |
| 2012/0213062 A1 | 8/2012 | Liang et al. |
| 2012/0213124 A1 | 8/2012 | Vasseur et al. |
| 2012/0307629 A1 | 12/2012 | Vasseur et al. |
| 2012/0321058 A1 | 12/2012 | Eng et al. |
| 2013/0003542 A1 | 1/2013 | Catovic et al. |
| 2013/0010610 A1 | 1/2013 | Karthikeyan et al. |
| 2013/0028073 A1 | 1/2013 | Tatipamula et al. |
| 2013/0070755 A1 | 3/2013 | Trabelsi et al. |
| 2013/0089093 A1 | 4/2013 | Bacthu et al. |
| 2013/0094647 A1 | 4/2013 | Mauro et al. |
| 2013/0100851 A1 | 4/2013 | Bacthu et al. |
| 2013/0128720 A1 | 5/2013 | Kim et al. |
| 2013/0177305 A1 | 7/2013 | Prakash et al. |
| 2013/0182604 A1 | 7/2013 | Moreno et al. |
| 2013/0198558 A1 | 8/2013 | Rao et al. |
| 2013/0250754 A1 | 9/2013 | Vasseur et al. |
| 2013/0250949 A1 | 9/2013 | Farinacci et al. |
| 2013/0275589 A1 | 10/2013 | Karthikeyan et al. |
| 2013/0311673 A1 | 11/2013 | Karthikeyan et al. |
| 2014/0049595 A1 | 2/2014 | Feng et al. |
| 2014/0126423 A1 | 5/2014 | Vasseur et al. |
| 2014/0133327 A1 | 5/2014 | Miyauchi |
| 2014/0198636 A1 | 7/2014 | Thayalan et al. |
| 2014/0204759 A1 | 7/2014 | Guo et al. |
| 2014/0207945 A1 | 7/2014 | Galloway et al. |
| 2014/0215077 A1 | 7/2014 | Soudan et al. |
| 2014/0219103 A1 | 8/2014 | Vasseur et al. |
| 2014/0258485 A1 | 9/2014 | Yang et al. |
| 2014/0293955 A1 | 10/2014 | Keerthi |
| 2014/0294005 A1 | 10/2014 | Jain et al. |
| 2014/0307541 A1 | 10/2014 | Badoni et al. |
| 2014/0337840 A1 | 11/2014 | Hyde et al. |
| 2014/0369375 A1 | 12/2014 | Yang et al. |
| 2015/0023174 A1 | 1/2015 | Dasgupta et al. |
| 2015/0052095 A1 | 2/2015 | Yang et al. |
| 2015/0124586 A1 | 5/2015 | Pani |
| 2015/0127701 A1 | 5/2015 | Chu et al. |
| 2015/0142702 A1 | 5/2015 | Nilsson et al. |
| 2015/0215365 A1 | 7/2015 | Shaffer et al. |
| 2015/0124590 A1 | 10/2015 | Chu et al. |
| 2015/0304117 A1 | 10/2015 | Dong et al. |
| 2015/0324689 A1 | 11/2015 | Wierzynski et al. |

(56) References Cited

U.S. PATENT DOCUMENTS

| | | |
|---|---|---|
| 2015/0358248 A1 | 12/2015 | Saha et al. |
| 2016/0037304 A1 | 2/2016 | Dunkin et al. |
| 2016/0105345 A1 | 4/2016 | Kim et al. |
| 2016/0203404 A1 | 7/2016 | Cherkasova et al. |
| 2016/0315802 A1 | 10/2016 | Wei et al. |
| 2016/0330046 A1 | 11/2016 | Yang et al. |
| 2016/0335111 A1 | 11/2016 | Bruun et al. |
| 2017/0093834 A1* | 3/2017 | Natu .................. H04L 63/08 |
| 2017/0150399 A1 | 5/2017 | Kedalagudde et al. |
| 2017/0228251 A1 | 8/2017 | Yang et al. |
| 2017/0289033 A1 | 10/2017 | Singh et al. |
| 2017/0347308 A1 | 11/2017 | Chou et al. |
| 2017/0353361 A1 | 12/2017 | Chopra et al. |
| 2018/0013656 A1 | 1/2018 | Chen |
| 2019/0132241 A1 | 5/2019 | Vattem et al. |

OTHER PUBLICATIONS

Alsheikh, Mohammad Abu, et al., "Machine Learning in Wireless Sensor Networks: Algorithms, Strategies, and Applications," Mar. 19, 2015, 23 pages.

Author Unknown, "White Paper on Service Enabler Virtualization," Draft dated Nov. 9, 2015, 26 pages, Open Mobile Alliance (OMA), San Diego, CA, USA.

Baccour, Nouha, et al., "Radio Link Quality Estimation in Wireless Sensor Networks: A Survey," 2011, 35 pages.

Fan, Na, "Learning Nonlinear Distance Functions Using Neural Network for Regression with Application to Robust Human Age Estimation," Abstract, 1 page, IEEE International Conference on Computer Vision (ICCV), Nov. 2011, Institute of Electrical and Electronics Engineers, Barcelona, Spain.

Flushing, Eduardo Feo, et al.: "A mobility-assisted protocol for supervised learning of link quality estimates in wireless networks," Feb. 2012, 8 pages.

Fortunato, Santo, "Community Detection in Graphs", arXiv:0906. 0612v2 [physics.soc-ph]; Physics Reports 486, 75-174, Jan. 25, 2010, 103 pages.

Godsill, Simon, et al., "Detection and suppression of keyboard transient noise in audio streams with auxiliary keybed microphone," Abstract, 1 page, 2015 IEEE International Conference on Acoustics, Speech and Signal Processing (ICASSP), Apr. 19-24, 2015, Brisbane, QLD, Australia (Abstract available at http://ieeexplore.ieee.org/document/7177995/, downloaded on Feb. 28, 2018.

Hershey, Shawn, et al., "CNN Architectures for Large-Scale Audio Classification," Jan. 10, 2017, 5 pages, Google, Inc., New York, NY, and Mountain View, CA, USA.

Hradis, Michael, et al., "Voice activity detection from gaze in video mediated communication," ACM, Mar. 28-30, 2012 http://medus.fit.vutbr.cz/TA2/TA2, 4 pages.

Hui, J., et al., "An IPv6 Routing Header for Source Routes with the Routing Protocol for Low-Power and Lossy Networks (RPL)", Request for Comments 6554, Mar. 2012, 12 pages, Internet Engineering Task Force Trust.

Kuklinski, Slawomir, et al., "Design Principles of Generalized Network Orchestrators," 2016 IEEE International Conference on Communications Workshops (ICC), May 23, 2016, pp. 430-435.

Liu, Tao, et al., "Data-driven Link Quality Prediction Using Link Features," ACM Transactions on Sensor Networks, Feb. 2014, 35 pages.

McKenna, Shannon, et al., "Acoustic Event Detection Using Machine Learning: Identifying Train Events," Sep. 2017, pp. 1-5, http://cs229.stanford.edu/proj2012/McKennaMcLaren-AcousticEventDetectionUsingMachineLearningIdentifyingTrainEvents.pdf, downloaded on Feb. 28, 2018.

Newman, M. E. J., "Analysis of weighted networks," Phys. Rev. E 70, 056131, Jul. 20, 2004, 9 pages, http://arxiv.org/pdf/condmat/0407503.pdf.

Newman, W. E. J., "Modularity and Community Structure in Networks", Proceedings of the National Academy of Sciences of the United States of America, Jun. 2006, vol. 103, No. 23, pp. 8577-8582, PNAS, Washington, DC.

Piczak, Karol J., "Environmental Sound Classification With Convolutional Neutral Networks," 2015 IEEE International Workshop on Machine Learning for Signal Processing, Sep. 17-20, 2015, Boston, USA.

Raghavendra, Kulkami V., et al., "Computational Intelligence in Wireless Sensor Networks: A Survey," Abstract, 1 page, IEEE Communications Surveys & Tutorials, May 27, 2010.

Salamon, Justin, et al., "Deep Convolutional Neutral Networks and Data Augmentation for Environmental Sound Classification," IEEE Signal Processing Letters, Accepted Nov. 2016, 5 pages.

Siddiky, Feroz Ahmed, et al., "An Efficient Approach to Rotation Invariant Face Detection Using PCA, Generalized Regression Neural Network and Mahalanobis Distance by Reducing Search Space," Abstract, 1 page, 10th International Conference on Computer and Information Technology, Dec. 2007, Dhaka, Bangladesh.

Singh, Shio Kumar, et al., "Routing Protocols in Wireless Sensor Networks—A Survey," International Journal of Computer Science & Engineering Survey (IJCSES) vol. 1, No. 2, Nov. 2010, pp. 63-83.

Tang, Pengcheng, et al., "Efficient Auto-scaling Approach in the Telco Cloud using Self-learning Algorithm," 2015 IEEE Global Communications Conference (Globecom), Dec. 6, 2015, pp. 1-6.

Tang, Yongning, et al., "Automatic belief network modeling via policy interference for SDN fault localization," Journal of Internet Services and Applications, Jan. 20, 2016, pp. 1-13, Biomed Central Ltd., London, UK.

Ting, Jo-Anne, et al., "Variational Bayesian Least Squares: An Application to Brain-Machine Interface Data," Neural Networks, vol. 21, Issue 8, Oct. 2008, pp. 1112-1131, Elsevier.

Tsang, Yolanda, et al., "Network Radar: Tomography from Round Trip Time Measurements," ICM'04, Oct. 25-27, 2004, Sicily, Italy.

Vasseur, JP., et al., "Routing Metrics Used for Path Calculation in Low-Power and Lossy Networks," Request for Comments 6551, Mar. 2012, 30 pages, Internet Engineering Task Force Trust.

Winter, T., et al., "RPL: IPv6 Routing Protocol for Low-Power and Lossy Networks," Request for Comments 6550, Mar. 2012, 157 pages, Internet Engineering Task Force Trust.

Zhang, Xiaoju, et al., "Dilated convolution neutral network with LeakyReLU for environmental sound classification," Abstract, 1 pages, 2017 $22^{nd}$ International Conference on Digital Signal Processing (DSP), Aug. 23-25, 2017, London, U.K.

Zinkevich, Martin, et al. "Parallelized Stochastic Gradient Descent," 2010, 37 pages.

"VXLAN Network with MP-BGP EVPN Control Plan Design Guide," @Cisco Systems, Inc., Mar. 21, 2016, pp. 1-44.

* cited by examiner

INTEROPERABILITY BETWEEN DATA PLANE LEARNING ENDPOINTS AND CONTROL PLANE LEARNING ENDPOINTS IN OVERLAY NETWORKS

CROSS-REFERENCE TO RELATED APPLICATIONS

This application is a continuation of U.S. application Ser. No. 15/143,202, filed on Apr. 29, 2016, the content of which is incorporated herein by reference in its entirety.

TECHNICAL FIELD

This disclosure relates in general to the field of communications and, more particularly, to enabling interoperability between data plane learning endpoints and control plane learning endpoints in an overlay network environment.

BACKGROUND

To meet growing demands for scalable network environments, overlay network technologies have been implemented for network virtualization. For example, overlay networks, such as Virtual Extensible Local Area Networks (VXLANs), allow network administrators to expand a current physical network infrastructure by creating virtual networks over the physical network infrastructure. Solutions are needed for ensuring interoperability between evolving overlay technologies with existing overlay network deployments.

BRIEF DESCRIPTION OF DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS OVERVIEW

Figure 1:
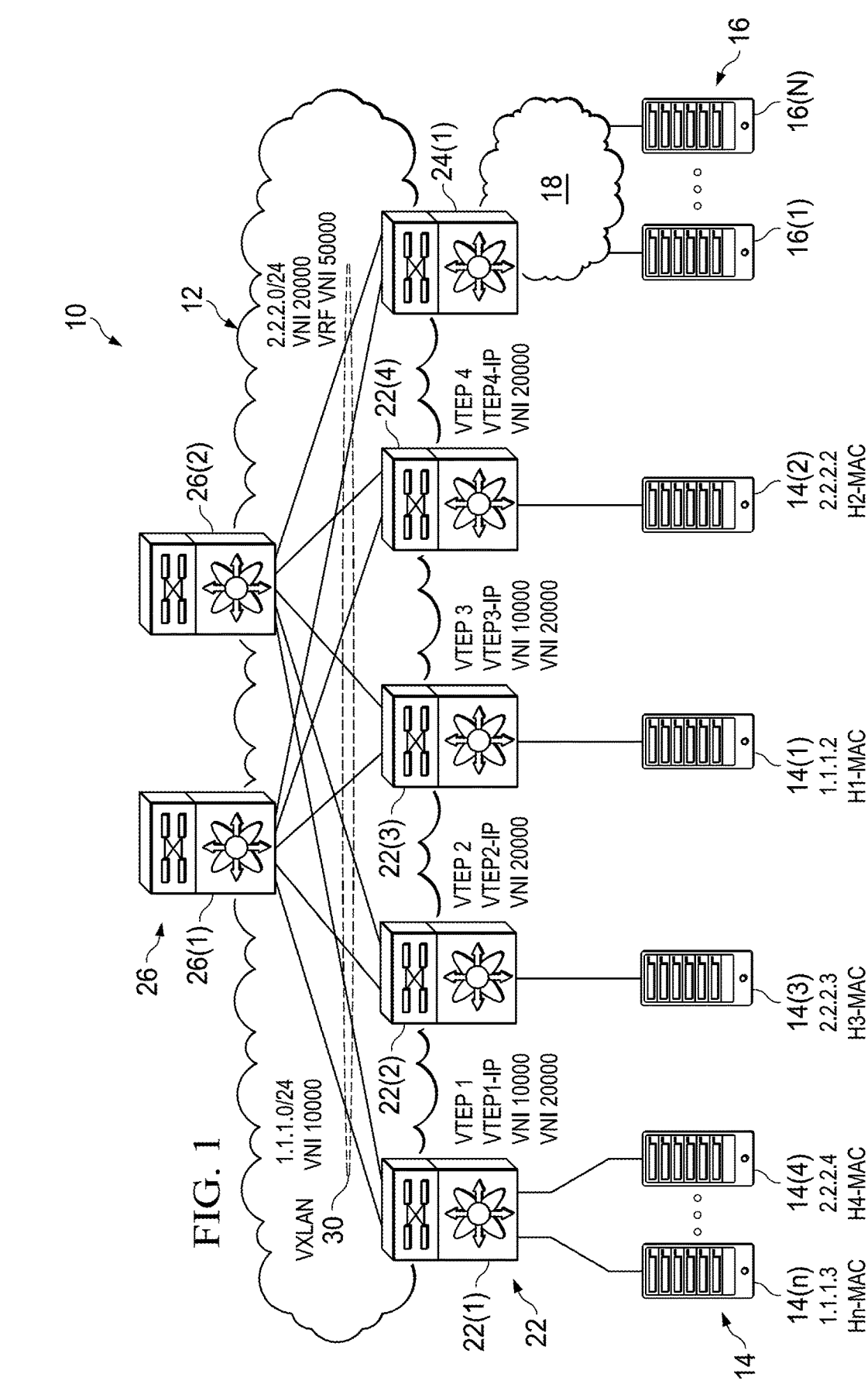
FIG. 1 is a simplified schematic block diagram illustrating a communication system for enabling network virtualization in a network environment.

A system and a method are disclosed for enabling interoperability between data plane learning endpoints and control plane learning endpoints in an overlay network in a network environment. An exemplary method for managing network traffic in the overlay network environment includes receiving network packets in an overlay network from data plane learning endpoints and control plane learning endpoints, wherein the overlay network extends Layer 2 network traffic over a Layer 3 network; operating in a data plane learning mode when a network packet is received from a data plane learning endpoint; and operating in a control plane learning mode when the network packet is received from a control plane learning endpoint. The overlay network can facilitate media access control (MAC) in Internet Protocol (IP) encapsulation. In some implementations, the overlay network is a Virtual Extensible Local Area Network (VXLAN), and the data plane learning endpoints and the control plane learning endpoints may be VXLAN tunnel endpoints (VTEPs).

In some implementations, the method further includes disabling Layer 2 learning when operating in the control plane learning mode. In some implementations, the method further includes operating in the data plane learning mode when the network packet is received from the data plane learning endpoint includes de-encapsulating the network packet; performing Layer 2 learning on the de-encapsulated network packet; and forwarding the de-encapsulated network packet to a destination specified in the de-encapsulated network packet. In some implementations, the method further includes de-encapsulating network packets received from unknown endpoints in the overlay network.

The overlay network can include more than one overlay segment. In some implementations, the method further includes operating as an anchor node for routing inter-overlay segment traffic to and from hosts operating behind the data plane learning endpoints. Operating as the anchor node may include resolving address resolution protocol (ARP) requests for a default gateway from the hosts operating behind the data plane learning endpoints. Operating as the anchor node may include advertising reachability information learned from the ARP requests for the hosts operating behind the data plane learning endpoints through a control plane of the overlay network.

In some implementations, the method further includes building an endpoint identification table. The endpoint identification table can include entries that indicate a learning mode of endpoints discovered in the overlay network. In some implementations, the method further includes generating an entry for an endpoint in the endpoint identification table that indicates the data plane learning mode for the endpoint; and upon receiving network traffic from the endpoint through a control plane of the overlay network, updating the entry for the endpoint to indicate the control plane learning mode for the endpoint.

Example Embodiments

Cisco® Programmable fabric, a data center fabric having a spine-leaf architecture, optimizes connectivity and communication in network environments, particularly data center environments. The spine-leaf architecture interconnects leaf switches (which connect hosts to the data center fabric), border leaf switches (which connect external hosts to the data center fabric), and spine switches (which connect leaf switches and/or border leaf switches to one another) in a manner that allows reachability to every host (end node) connected to the data center fabric through a same number of hops. Cisco® Programmable fabric optimizes both Layer 2 and Layer 3 in a network, simplifying application deployment (physical and virtual) and providing consistency (quality of service (QoS), availability of network services, user experience, etc.) at all points in the network for various deployment scenarios. By moving a boundary between Layer 2 and Layer 3 to the leaf switches, Cisco® Programmable fabric localizes (terminates) Layer 2 failure domain and host-originated discovery protocols (such as Address Resolution Protocol (ARP), Dynamic Host Configuration Protocol (DHCP), Neighbor Discovery Protocol (ND) (also referred to as flood-and-learn), and/or other host-originated discovery protocols) at the leaf switches. Cisco® Programmable fabric also avoids trombone effects experienced by traditional network fabrics by deploying the leaf switches with Layer 3 distributed anycast gateway functionality (for example, by assigning all leaf switches for a subnet the same virtual gateway Internet Protocol (IP) address and the same virtual media access control (MAC) address), ensuring that network traffic is forwarded to a closest possible hop from the hosts. Cisco® Programmable fabric thus exhibits a scale-out model for optimized growth, where a network implementing Cisco® Programmable fabric can handle demands associated with adding leaf switches, border leaf switches, and/or spine switches to the network in a scalable and agile manner.

FIG. 1 is a simplified schematic block diagram illustrating a communication system 10 for enabling network virtualization in a network environment. In FIG. 1, communication system 10 includes a network 12 (generally shown as various links) that interconnect hosts 14(1), 14(2), . . . , and 14(n) (generally referred to as hosts 14) and external hosts 16(1), 16(2), . . . , and 16(N) (generally referred to as external hosts 16), where n represents a total number of hosts 14 and N represents a total number of external hosts 16. External hosts 16 connect to network 12 over an external network 18. Hosts 14 can communicate (for example, by receiving/forwarding packets) with each other over network 12, and hosts 14 can communicate (for example, by receiving/forwarding packets) with external hosts 16 connected to network 12 over external network 18. As used herein, the term "host" may include any network element, physical (for example, servers) or virtual (for example, virtual machines), connected to other network elements over a network; and the term "external host" may include any host connected to a network (for example, network 12) over an external network (for example, external network 18). Hosts can provide various information technology services, including web services, database services, data processing services, directory services, and/or other services to network elements. Hosts can be servers, applications, network storage facilities (for example, a database and/or a memory), and/or other network elements. In some implementations, hosts 14 represent physical network elements, such as servers, configured to host virtual hosts, such as virtual machines. Virtual machines can share resources without interfering with each other, enabling multiple operating systems and/or multiple applications to execute concurrently on hosts 14. Virtual hosts can be provided with computing, storage, and networking services for running application workloads.

Network 12 represents a network fabric that provides a multistage, switching network in which every connected host (for example, hosts 14) is reachable through a same number of hops. In some implementations, network 12 represents a data center network that deploys Cisco® Programmable fabric. Network 12 can include various network nodes configured to perform spine/leaf roles, enabling a scale-out model for optimizing growth of communication system 10—a leaf switch 22(1), a leaf switch 22(2), a leaf switch 22(3), and a leaf switch 22(4) (generally referred to as leaf switches 22) that connect hosts 14 to network 12; a border leaf switch 24(1) (generally referred to as border leaf switches 24) that connects external hosts 16 to network 12; and a spine switch 26(1) and a spine switch 26(2) (collectively referred to as a fabric spine 26 of network 12) that connect leaf switches 22 and/or border leaf switches 24 to one another. In various embodiments, each leaf switch 22 serves as a Top-Of-Rack (ToR) switch of a respective rack unit in a data center network environment, where network 12 serves as the data center network. Leaf switches 22, border leaf switches 24, and spine switches 26 can connect to network 12 via network interfaces, such as ports through which leaf switches 22, border leaf switches 24, and/or spine switches 26 connect to one another. Leaf switches 22 can include host interfaces, for example, ports through which hosts 14 connect to leaf switches 22, such that leaf switches 22 can forward packets between hosts 14 over network 12. Border leaf switches 24 can connect to external network 18 via another network interface, such that border leaf switches 24 can forward packets between hosts 14 and external hosts 16 over network 12. External network 18 can be the Internet, a wide area network (WAN), a data center interconnect (DCI), other appropriate network, or any combination thereof. In various embodiments, network 12 can flexibly interconnect with other networks over external network 18 via border leaf switches 24. Fabric spine 26 can forward packets between leaf switches 22 and/or border leaf switches 24. In some network topologies, fabric spine 26 can include one level of switches (such as a 2-tier fat tree topology); and in other network topologies, fabric spine 26 can include multiple levels of switches (such as a 3-tier fat tree topology). Virtually any number of switches may be used in network 12 depending on network topology considerations for communication system 10.

As used herein, the term "switch" includes any network element configured to receive packets from a source (for example, host 14(3)) and forward packets appropriately to a destination in a network (for example, host 14(2)) or a destination out of network (for example, external host 16(1)). The term "leaf switch" is inclusive of routers, switches, and such other network elements with packet routing, bridging, and switching functionalities that are connected to one or more hosts (for example, hosts 14). The term "border leaf switch" is inclusive of routers, switches, and such other network elements with packet routing, bridging, and switching functionalities that are connected to external entities, such as one or more external hosts (for example, external hosts 16). The term "fabric spine" and/or "spine switch" is inclusive of routers, switches, and such other network elements with packet routing, bridging, and switching functionalities that connect one or more leaf switches (for example, leaf switches 22) and/or one or more border leaf switches (for example, border leaf switches 24). Further, the term "leaf"/"border leaf" and "spine" are used merely to distinguish between two layers of switches in the network architecture depicted in FIG. 1, and are not meant to be limitations. In a general sense, a "leaf"/"border leaf" switch differs from a "spine" switch by being configured to anchor hosts 14 and/or external hosts 16 to network 12, and a "border leaf" switch differs from a "leaf" switch by being configured to anchor external entities (for example, external hosts 16) to network 12. Furthermore, as used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

Communication system 10 can include a network topology configured to include any number of servers, virtual machines, switches, routers, and other network nodes interconnected to form network 12. Network elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Generally, network 12 is an underlay network, and an overlay network 30 for enabling leaf switches 22, border leaf switches 24, and/or spine switches 26 to communicate (for example, enabling reachability among switches) is deployed over network 12. The term "underlay network" generally refers to any physical network capable of supporting an overlay network, such as overlay network 30. In some implementations, network 12 is a Layer 3 (IP-based) network configured to connect network elements via Layer 3 routing, and overlay network 30 is a Layer 2 overlay scheme provisioned over a Layer 3 (IP-based) network. Examples of such overlay networks include a Virtual Extensible Local Area Network (VXLAN), a Network Virtualization Generic Routing Encapsulation (NV-GRE) network, Generic Network Virtualization Encapsulation (GENEVE), or any other suitable Layer 2 overlay scheme for provisioning over the Layer 3 network. In some implementations, overlay network 30 is an IP-based network virtualization technology that facilitates MAC-in-IP encapsulation. Alternatively, in some implementations, network 12 is a Layer 2 (non-IP based) network configured to connect network elements via Layer 2 routing, and overlay network 30 is a Layer 2 overlay scheme provisioned over a Layer 2 network. Examples of non-IP based underlay networks include a Multiprotocol Label Switching (MPLS) network, a Transparent Interconnection of Lots of Links (TRILL) network, a Cisco® FabricPath network, and/or other suitable non-IP based underlay network. In some implementations, the underlay network includes physical network elements (such as leaf switches 22, border leaf switches 24, and/or spine switches 26) interconnected using physical links, such as electrical links, optical links, and/or wireless links. In some implementations, network elements within overlay network 30 are connected via logical link and/or virtual links corresponding to network elements and/or physical links in the underlay network, such as network 12.

For purposes of the following discussion, network 12 is any Layer 3 network (also referred to as an Internet Protocol (IP) network) configured to connect network elements via Layer 3 routing (for example, using Interior Gateway Protocols, such as Open Shortest Path First (OSPF), Enhanced Interior Gateway Routing Protocol (EIGRP), or other suitable IGP), where overlay network 30 is deployed over network 12 to support network virtualization. In FIG. 1, overlay network 30 is a Layer 2 overlay scheme provisioned over a Layer 3 (IP-based) network, such as network 12. For purposes of describing aspects of the present disclosure, overlay network 30 is a Virtual Extensible Local Area Network ("VXLAN"), which generally refers to a Layer 2 overlay scheme for a Layer 3 network, where VXLAN segments define Layer 2 overlay networks over which hosts 14 can communicate through Layer 2 adjacencies. Each VXLAN segment (Layer 2 segment) is identified by a VXLAN network identifier ("VNID" or "VNI"), where hosts 14 within the same VXLAN segment and different VXLANs can communicate with one another. VXLAN tunnel endpoints (VTEPs) originate and terminate the VXLAN segments, where each VTEP maps hosts 14 to VXLAN segments and performs VXLAN encapsulation/de-encapsulation. In FIG. 1, to support overlay network 30, leaf switches 22 are configured as VTEPs that originate and terminate the VXLAN segments defining overlay network 30. For example, leaf switches 22 perform VXLAN encapsulation and de-encapsulation, as described further below, and map hosts 14 to the VXLAN segments. Accordingly, each leaf switch 22 has two interfaces: a switch interface, through which the VTEP connects to local hosts (here, hosts 14 and/or hosts 14), and an IP interface, through which the VTEP connects to a transport IP network (here, network 12). Each leaf switch 22 is identified in network 12 by a unique IP address associated with the IP interface, through which leaf switch 22 transmits VXLAN encapsulated packets to network 12. Leaf switch 22 also discovers remote VTEPs for its associated VXLAN segments, along with virtual hosts behind the remote VTEPs (allowing remote host MAC address to remote VTEP IP mapping) through its IP interface. VXLAN segments are independent of underlying network 12 (often referred to as an underlay network), and underlying network 12 between VTEPs is independent of overlay network 30.

VXLAN defines a VXLAN encapsulation protocol (often referred to as Media Access Control Address-in-User Datagram Protocol (MAC-in-UDP)) for extending the VXLAN (Layer 2) segments across network 12. VXLAN encapsulates original Layer 2 frames (for example, Ethernet frames) into UDP-IP packets and transports the encapsulated Layer 2 frames through network 12 using IP routing and forwarding mechanisms. For example, a VXLAN packet adds a VXLAN header to an original Layer 2 Frame, encapsulating the VXLAN header with the original Layer 2 Frame into a UDP payload of a network packet. The VXLAN header includes a VXLAN network identifier that identifies a VXLAN segment, maintaining isolation between the VXLAN segments. For example, in FIG. 1, network 12 defines a subnet 1.1.1.0/24 and a subnet 2.2.2.0/24, and overlay network 30 defines a VXLAN segment identified as VNI 10000 (which maps to subnet 1.1.1.0/24) and a VXLAN segment identified as VNI 20000 (which maps to subnet 2.2.2.0/24). In general, a subnet is a Layer 3 construct, while a VXLAN segment is a Layer 2 construct. As used herein, the term "subnet" is a logical grouping of connected network elements that share a contiguous range of IP addresses. A one-to-one relationship can exist between VXLAN segments and subnets, although it is possible to have multiple VXLAN segments mapped to a subnet. The VXLAN packet also includes a UDP header, where a destination port in the UDP header indicates that the network packet includes a VXLAN encapsulated packet, and an outer IP header, where a source IP address (SIP) in the outer IP header identifies an originating VTEP for the VXLAN segment and a destination IP address (DIP) in the outer IP header identifies a terminating VTEP for the VXLAN segment. The VXLAN packet format further includes an outer MAC (Layer 2) header that defines a MAC address for a destination for the VXLAN packet (in other words, an immediate next-hop). Leaf switches 22 route VXLAN packets for hosts 14 through network 12 using the outer IP header, which identifies the originating VTEP as the source IP address and the terminating VTEP as the destination IP address.

VXLAN uses stateless tunnels between VTEPs (here, leaf switches 22) to transmit Layer 2 network traffic of overlay network 30 through network 12. Assuming remote VTEP discovery and host address learning has occurred between leaf switches 22(1)-22(4), hosts 14 communicate with each other through VXLAN tunnels between leaf switches 22. Consider an example where host 14(3) and host 14(2) communicate with each other through a VXLAN tunnel between leaf switch 22(2) and leaf switch 22(4). When host 14(3) sends data to host 14(2), host 14(3) sends a network packet (also referred to as a data packet) to leaf switch 22(2) that includes Ethernet frames with a destination MAC address for host 14(2) (here, H2-MAC). Upon receiving the data packet, leaf switch 22(2) generates a VXLAN packet. For example, leaf switch 22(2) adds a VXLAN header (which includes VNI 20000 as the VXLAN network identifier) to the Ethernet frames and encapsulates the VXLAN header and Ethernet frames into a UDP payload. Leaf switch 22(2) also identifies leaf switch 22(4) as a destination for the data packet (for example, using a Layer 2 table that maps H2-MAC to leaf switch 22(4)), identifies an IP address (here, VTEP4-IP) for leaf switch 22(4) (for example, using a Layer 3 table), and then defines an outer IP header of the VXLAN packet. For example, leaf switch 22(2) sets a source IP address to an IP address for leaf switch 22(2) (here, VTEP2-IP) and a destination IP address to VTEP4-IP (the IP address for leaf switch 22(4)). Leaf switch 22(2) then sends the VXLAN packet over network 12 using the outer IP header, particularly, the destination IP address (which specifies VTEP4-IP). When leaf switch 22(4) receives the VXLAN packet, leaf switch 22(4) de-encapsulates the VXLAN packet (for example, by removing the Ethernet header, outer IP header, UDP header, and VXLAN header from the Ethernet frames) and forwards the Ethernet frames (data) to host 14(2) using H2-MAC, the destination MAC address for host 14(2) specified in an inner MAC header of the encapsulated VXLAN packet.

Network 12 includes an IP multicast backbone, where network 12 can deploy an appropriate protocol (such as Interior Gateway Protocol (IGP)) to ensure IP reachability for all VTEPs. Overlay network 30 can then utilize IP multicasting to transport multi-destination traffic (for example, broadcast, unknown unicast, and multicast traffic (often referred to as BUM traffic)) to VTEPs, preventing unnecessary information from being flooded to VTEPs. In such implementations, each VXLAN segment, or VNID, is mapped to an IP multicast group in network 12, and VXLAN packets are flooded to VTEPs that have joined the same IP multicast group. For example, in FIG. 1, VNI 20000 (the VXLAN segment that includes leaf switches 22(1)-22(4)) can be mapped to a VXLAN multicast group A in network 12 having an IP multicast group address A, which can be used to transmit VXLAN BUM traffic through network 12, limiting Layer 2 flooding of network traffic associated with VNI 20000 to VTEPs participating in VNI 20000. In some implementations, multiple VXLAN segments (and thus VNIs) can share a same VXLAN multicast group. For example, in the depicted embodiment, VNI 10000 (the VXLAN segment that includes leaf switch 22(1) and leaf switch 22(3)) may also be mapped to VXLAN multicast group A. Since leaf switch 22(2) and leaf switch 22(4) are also members of VXLAN multicast group A, yet not joined with VNI 10000, leaf switch 22(2) and leaf switch 22(4) will receive BUM traffic for both VNI 10000 and VNI 20000, dropping IP multicast VXLAN packets that identify VNI 10000 in the VXLAN headers. In some implementations, leaf switch 22(1), leaf switch 22(2), leaf switch 22(3), and leaf switch 22(4) each join IP multicast group A as an IP host through an Internet Group Management Protocol (IGMP), which triggers Protocol Independent Multicast (PIM) signaling through network 12 for VXLAN multicast group A and allows leaf switches 22(1)-22(4) to perform remote VTEP discovery and remote host address learning.

Traditionally, overlay network 30 operates without a control plane, for example, in a flood-and-learn (FL) mode that drives data plane learning. Flood-and-learn VTEPs (also referred to as data plane learning VTEPs) use existing Layer 2 mechanisms for (1) transporting BUM traffic, (2) discovering remote VTEPs, and (3) learning remote host MAC addresses and MAC-to-VTEP mappings for each VXLAN segment. In such implementations, forward traffic requesting reachability information is often flooded over network 12 using multicasting, while reverse traffic providing the requested reachability information traverses network 12 using unicasting. For example, where leaf switches 22(1)-22(4) are configured as data plane learning VTEPs and no remote VTEP discovery and/or remote host address learning has occurred between leaf switches 22(1)-22(4), consider what happens when host 14(3) (having an IP address of 2.2.2.3/24 and a MAC address of H3-MAC) initiates communication with host 14(2) (having an IP address of 2.2.2.2/24 and a MAC address of H2-MAC). Host 14(3) sends an ARP request for host 14(2) to leaf switch 22(2) (having an IP address of VTEP2-IP) on overlay network 30, the ARP request designating H3-MAC as a source MAC address. Since leaf switch 22(2) does not know a MAC address for H2-IP, leaf switch 22(2) encapsulates the ARP request in an IP multicast VXLAN packet and forwards the IP multicast VXLAN packet to the VXLAN multicast group A. For example, the IP multicast VXLAN packet encapsulates the ARP request in a UDP payload (along with VNI 20000 and an inner MAC address that defines H3-MAC as a source MAC address) with an outer IP header that specifies VTEP2-IP as the source IP address and IP multicast group address A as the destination IP address. The IP multicast VXLAN packet is then distributed to all members of VXLAN multicast group A (here, leaf switches 22(1)-22(4)). Each member of the VXLAN multicast group A de-encapsulates the IP multicast VXLAN packet and checks the VXLAN header for the VNID (here, identifying VNI 20000). Since leaf switch 22(1), leaf switch 22(3), and leaf switch 22(4) are each members of VNI 20000, leaf switch 22(1), leaf switch 22(3), and leaf switch 22(4) learn an IP address of leaf switch 22(2) (here, VTEP2-IP) from the source IP address defined in the outer IP address header of the IP multicast VXLAN packet, along with a MAC address for host 14(3) (here, H3-MAC) specified in the ARP request of the IP multicast VXLAN packet. Leaf switch 22(1), leaf switch 22(3), and leaf switch 22(4) can then generate an entry that maps VNI 20000 and H3-MAC to VTEP2-IP in respective Layer 2 tables. Each leaf switch 22(1), leaf switch 22(3), and leaf switch 22(4) then forwards the ARP request to hosts 14 attached thereto.

When host 14(2) receives the ARP request from leaf switch 22(4), host 14(2) generates and sends an ARP reply to leaf switch 22(4), the ARP reply designating H2-MAC as the source MAC address and H3-MAC as the destination MAC address. Host 14(2) can also generate an entry in a routing/forwarding table that maps the IP address of host 14(3) (here, 2.2.2.3/24) to H3-MAC. Since leaf switch 22(4) knows mapping for H3-MAC (as noted above, leaf switch 22(4) maps H3-MAC to VTEP2-IP), leaf switch 22(4) encapsulates the ARP reply in a unicast VXLAN packet and forwards the unicast VXLAN packet to leaf switch 22(2) using a unicast tunnel. For example, the unicast VXLAN packet encapsulates VNI 20000 (the VXLAN identifier) and the ARP reply (with the inner MAC address designating H2-MAC as the source MAC address and H3-MAC as the destination MAC address) in a UDP payload, along with an outer IP header that specifies VTEP4-IP as the source IP address and VTEP2-IP as the destination IP address. When leaf switch 22(2) receives the unicast VXLAN packet from leaf switch 22(4), leaf switch 22(2) de-encapsulates the unicast VXLAN packet and forwards the ARP reply to host 14(3). Leaf switch 22(2) also learns an IP address of leaf switch 22(4) (here, VTEP4-IP) from the source IP address defined in the outer IP address header, along with a MAC address for host 14(2) (here, H2-MAC) specified in the ARP reply. Leaf switch 22(2) can then generate an entry that maps VNI 20000 and H2-MAC to VTEP4-IP in a Layer 2 table. Leaf switch 22(2) can also generate an entry that maps H2-MAC to the IP address for host 14(2) (here, 2.2.2.2/24). Subsequent VXLAN packets between host 14(3) and host 14(2) are then unicast over the VXLAN tunnel between leaf switch 22(2) and leaf switch 22(4) based on mapping information gleaned from leaf switch 22(2) and leaf switch 22(4). In some implementations, to reduce flooding over network 12, leaf switch 22(2) can perform proxy ARPs for subsequent ARP requests for the IP address of host 14(2).

Network traffic requesting reachability information is also flooded over network 12 using static ingress replication (IR), and reverse traffic provides the requested reachability information using unicasting. In such implementations, overlay network 30 is configured to use static IR for flooding BUM traffic to data plane learning VTEPs belonging to the same VXLAN segment. With static IR, VNI membership is statically configured at each data plane learning VTEP belonging to a VNI. For example, for VNI 20000, leaf switch 22(1) is statically configured with IP reachability information for VTEP members of VNI 20000, such as a list of IP addresses for leaf switch 22(2), leaf switch 22(3), and leaf switch 22(4). Similarly, leaf switch 22(2), leaf switch 22(3), and leaf switch 22(4) are each statically configured with IP reachability information for VTEP members of VNI 20000. Then, multi-destination traffic is delivered in a unicast manner to each statically configured remote VTEP. For example, in the scenario described above where leaf switch 22(2) receives the ARP request for host 14(2) from host 14(3) and leaf switch 22(2) does not know the MAC address for host 14(2), leaf switch 22(2) encapsulates the ARP request into three different unicast VXLAN packets, where each unicast VXLAN packet encapsulates the ARP request in a UDP payload (along with VNI 20000 and the inner MAC address that defines H3-MAC as the source MAC address), along with an outer IP header that specifies VTEP2-IP as the source IP address. Leaf switch 22(2) specifies different destination IP addresses for the VTEPs belonging to VNI 20000, forwarding a unicast VXLAN packet to leaf switch 22(1) that specifies VTEP1-IP as the destination IP address in the outer IP header, forwarding a unicast VXLAN packet to leaf switch 22(3) that specifies VTEP3-IP as the destination IP address in the outer IP header, and forwarding a unicast VXLAN packet to leaf switch 22(4) that specifies VTEP4-IP as the destination IP address in the outer IP header. Leaf switch 22(1), leaf switch 22(3), and leaf switch 22(4) then de-encapsulate their respectively received unicast VXLAN packet. Leaf switch 22(1), leaf switch 22(3), and leaf switch 22(4) learn an IP address of leaf switch 22(2) (here, VTEP2-IP) from the source IP address defined in the outer IP address header of their respective unicast VXLAN packet, along with a MAC address for host 14(3) (here, H3-MAC) specified in the ARP request of their respectively received unicast VXLAN packet. Leaf switch 22(1), leaf switch 22(3), and leaf switch 22(4) can then generate an entry that maps VNI 20000 and H3-MAC to VTEP2-IP in respective Layer 2 tables. Leaf switch 22(1), leaf switch 22(3), and leaf switch 22(4) then forward the ARP request to hosts 14 attached thereto, and reverse traffic (where host 14(2) provides its reachability information to host 14(3)) proceeds similar to the multicasting scenario described above.

Overlay network 30 faces scalability challenges when configured as a flood-and-learn VXLAN, particularly for large multitenant network environments. For example, flooding required by data plane learning VTEPs (in particular, flooding of BUM traffic, including numerous ARP requests/replies or neighbor discovery requests/replies) to learn reachability information for remote VTEPs and remote hosts impedes scalability of communication system 10. To overcome such limitations, overlay network 30 can operate with a control plane, for example, in an Ethernet Virtual Private Network (EVPN) mode that drives control plane learning. For example, overlay network 30 uses Multiprotocol Border Gateway Protocol Ethernet Virtual Private Network (MP-BGP EVPN) as the control plane for the VXLAN overlay network. EVPN VTEPs (also referred to as control plane learning VTEPs) use an MP-BGP EVPN control plane for (1) discovering remote VTEPs and (2) learning remote host MAC addresses and MAC-to-VTEP mappings for each VXLAN segment, while performing VXLAN encapsulation/de-encapsulation in the data plane for network traffic sent/received through overlay network 30 over network 12 (serving as the IP underlay network). Such approach reduces network flooding for host learning and enhances control over host reachability information distribution. Because the MP-BGP EVPN control plane can advertise reachability information for remote VTEPs and remote hosts, the MP-BGP EVPN control plane enhances overlay network 30, for example, by significantly reducing flooding (such as unknown unicast flooding), optimizing handling of multi-destination traffic (such as BUM traffic), and facilitating localized ARP suppression in communication system 10.

The MP-BGP EVPN control plane supports multitenancy network environments with Layer 2 segmentation and Layer 3 segmentation. Layer 2 VNIs (such as VNI 20000 and VNI 10000) define Layer 2 domains and enforce Layer 2 segmentation, not allowing Layer 2 traffic to traverse Layer 2 VNI boundaries. Similarly, Layer 3 VNIs define Layer 3 domains and enforce Layer 3 segmentation, not allowing Layer 3 traffic to traverse Layer 3 VNI boundaries. Layer 3 segmentation applies Layer 3 virtual routing and forwarding (VRF) technology to achieve separation among tenants (such as VXLAN tenants in overlay network 30) in a multitenancy network environment. Since each tenant has its own VRF instance, routing isolation between tenants is achieved by mapping a unique Layer 3 VNI to each VRF instance. IP subnets of the VNIs for a given tenant are in the same Layer 3 VRF instance that separates the Layer 3 routing domain from the other tenants. For example, in FIG. 1, a tenant associated with overlay network 30 has a VRF instance that is mapped to a Layer 3 VNI designated as VRF VNI 50000, where all inter-VNI network traffic is encapsulated with the Layer 3 VNI in the VXLAN header, providing the VRF context for control plane learning VTEPs receiving the inter-VNI network traffic. The receiving control plane learning VTEPs can use the Layer 3 VNI to identify the VRFcontext for forwarding the inner IP packet. VRF instance generally refers to a routing/forwarding table instance that can exist in one or more instances per virtual private network on a switch, such as leaf switches 22, and/or multiple instances of a routing table that coexist on a switch, such as leaf switches 22, at the same time. Because the routing instances are independent, the same or overlapping IP addresses can be used without conflict. The MP-BGP EVPN control plane thus allows multiple tenants to co-exist and share a common IP transport network while having separate virtual private networks in overlay network 30.

MP-BGP EVPN is fully described in Internet Engineering Task Force (IETF) Request for Comment (RFC) 7432 (February 2015), entitled "BGP MPLS Based Ethernet VPN," which is incorporated herein by reference. MP-BGP EVPN distributes EVPN network layer reachability information (NLRI), which includes both Layer 2 and Layer 3 reachability information, for VTEPs and/or hosts that reside in overlay network 30, enabling integrated bridging and routing in overlay network 30. EVPN NLRI advertises both MAC addresses and IP addresses of hosts 14 attached to control plane learning VTEPs. EVPN NLRI is carried in BGP using the BGP multiprotocol extension with a new address family called Layer-2 VPN (L2VPN) EVPN Similar to the VPNv4 address-family in the BGP MPLS-based IP VPN (RFC 4364), the L2VPN EVPN address family for EVPN uses route distinguishers (RDs) to maintain uniqueness among identical routes in different VRF instances, and uses route targets (RTs) to define policies that determine how routes are advertised and shared by different VRF instances. EVPN introduces different Route Types, including Route Type 1 (Ethernet Auto-Discovery Routes), Route Type 2 (MAC/IP Advertisement Route), Route Type 3 (Inclusive Multicast Ethernet Tag Route), Route Type 4 (Ethernet Segment Route), and Route Type 5 (IP Prefix Route). Using Route Type 2 messages, leaf switches 22 can advertise local virtual hosts' IP addresses and MAC addresses within EVPN NLRI, facilitating control plane learning of remote hosts' reachability information. A Route Type 2 message includes the following information: a route distinguisher, a host MAC address, a host IP address, and an Ethernet Tag ID, which includes a Layer 2 VNI (identifying a bridge domain to which host belongs) and/or a Layer 3 VNI (identifying a tenant VRF routing instance), and a next-hop. When a control plane learning VTEP originates a Route Type 2 message for its learned locally attached hosts, the control plane learning VTEP specifies its own IP address as the BGP next-hop. To ensure that remote control plane learning VTEPs learn the originating control plane learning VTEP's address as the next-hop for VXLAN encapsulation when forwarding packets in overlay network 30, the BGP next-hop remains unchanged through the route distribution across network 12. A Route Type 3 message includes the following information: a route distinguisher, an Ethernet Tag ID (which includes a Layer 2 VNI and/or a Layer 3 VNI), an originator IP address (which includes an IP address for the control plane learning VTEP).

Control plane learning VTEPs learn IP reachability information for locally attached hosts through data plane learning. In FIG. 1, when configured as control plane learning VTEPs, leaf switches 22 learn reachability information, such as IP-to-MAC bindings, for locally attached hosts 14 using Layer 2 learning mechanisms. For example, leaf switch 22(1) learns IP-to-MAC bindings for locally attached host 14(4) and host 14(n); leaf switch 22(2) learns IP-to-MAC bindings for locally attached host 14(3); leaf switch 22(3) learns IP-to-MAC bindings for locally attached host 14(1); and leaf switch 22(4) learns IP-to-MAC bindings for locally attached host 14(2). In some implementations, leaf switches 22 learn using standard Ethernet and IP learning procedures, such as MAC address learning from source MAC addresses specified in received Ethernet frames and IP address learning from source IP addresses specified in received ARP requests (for example, ARP requests for a gateway IP address on leaf switches 22, gratuitous ARP (GARP) requests, and/or reverse ARP (RARP) requests). In some implementations, leaf switches 22 learn IP-to-MAC bindings for locally attached hosts 14 through DHCP or ARP snooping. Alternatively, in some implementations, leaf switches 22 learn IP reachability information for locally attached hosts 14 through control plane learning or management-plane integration between leaf switches 22 and hosts 14.

After learning reachability information for locally attached hosts, control plane learning VTEPs advertise the locally attached host reachability information in the MP-BGP EVPN control plane to MP-BGP peers, enabling control plane learning VTEPs to learn reachability information for remote hosts in the MP-BGP EVPN control plane. The MP-BGP EVPN control plane thus serves as a single source of truth for all forwarding information (within and across subnets), including reachability information, such as MAC addresses and IP addresses, for every endpoint and/or host in overlay network 30. In FIG. 1, when configured as control plane learning VTEPs, upon learning IP-to-MAC bindings for locally attached hosts 14, leaf switches 22(1)-22(4) advertise host reachability information (such as the learned IP-to-MAC bindings) to all leaf switches 22 belonging to the same VXLAN segment. For example, when leaf switch 22(4) learns an IP-to-MAC binding for host 14(2) (here, mapping an IP address of 2.2.2.2/24 to a MAC address of H2-MAC), leaf switch 22(4) transmits a route advertisement (for example, a Route Type 2 message) to all leaf switches 22 belonging to the same VXLAN segment (here, leaf switch 22(1), leaf switch 22(2), and leaf switch 22(3) belonging to VNI 20000). The route advertisement can define a route type as a MAC/IP advertisement route, an Ethernet tag ID as a VXLAN identifier of the VXLAN segment (here, VNI 20000), a MAC address of host 14(2) (here, H2-MAC), an IP address of host 14(2) (here, 2.2.2.2/24), and a next hop as leaf switch 22(4) (here, VTEP4-IP, the IP address of leaf switch 22(4)). Upon receiving the route advertisement, leaf switch 22(1), leaf switch 22(2), and leaf switch 22(3) can update forwarding information for host 14(2) and begin forwarding network traffic from respective locally attached hosts 14 to host 14(2). For example, leaf switch 22(1), leaf switch 22(2), and leaf switch 22(3) can each generate a Layer 2 table entry that specifies the IP-to-MAC binding for host 14(2) (here, H2-MAC to 2.2.2.2/2) and generate a Layer 2 entry that specifies the MAC-to-VTEP binding for host 14(2) (here, H2-MAC to VTEP4-IP). Returning to the scenario described above, where leaf switch 22(2) receives the ARP request for host 14(2) from host 14(3), since leaf switch 22(2) has learned reachability information for host 14(2) from the MP-BGP EVPN control plane via Route Type 2 messages, leaf switch 22(2) can respond to host 14(3) with the MAC address of host 14(2) without flooding overlay network 30 with BUM traffic including the ARP request. Leaf switch 22(2) can also begin forwarding network traffic from host 14(3) to host 14(2) using the reachability information gleaned about host 14(2) from leaf switch 22(4) in the control plane. In contrast, in traditional flood-and-learn overlay networks as described above, since leaf switch 22(2) will not learn the MAC address for host 14(2) until host 14(2) sends network traffic to host 14(3) or host 14(2) responds to BUM traffic received from host 14(3) (for example, the ARP request), leaf switch 22(2) floods any network traffic from host 14(3) towards host 14(2) as BUM traffic across all leaf switches 22 in the same VXLAN segment (such as leaf switch 22(1), leaf switch 22(3), and leaf switch 22(4) belonging to VNI 20000).

Using Route Type 3 messages, leaf switches 22 can discover and authenticate remote VTEPs, along with setting up multicasting for BUM traffic on a per VXLAN segment. With the MP-BGP EVPN control plane, each control plane learning VTEP establishes BGP neighbor adjacency with other control plane learning VTEPs. For example, consider when leaf switch 22(4) advertises its reachability information using multicasting. Leaf switch 22(4) transmits a route advertisement (for example, a Route Type 3 message) to all leaf switches 22 belonging to the same VXLAN segment (here, leaf switch 22(1), leaf switch 22(2), and leaf switch 22(3) belonging to VNI 20000). The route advertisement can define a route type as an Inclusive Multicast Ethernet Tag route, an Ethernet tag ID as a VXLAN identifier of the VXLAN segment (here, VNI 20000), an originator IP address of leaf switch 22(4) (here, VTEP4-IP), and a tunnel identifier specifying IP multicast group address A (associated with VXLAN multicast group A, to which leaf switches 22(1)-22(4) belong). As soon as leaf switch 22(1), leaf switch 22(2), and leaf switch 22(3) receive the route advertisement from leaf switch 22(4) (a BGP neighbor), leaf switch 22(1), leaf switch 22(2), and leaf switch 22(3) add the IP address of leaf switch 22(4) (here, VTEP4-IP) to a VTEP peer list (also referred to as a white list that identifies valid VTEP peers in overlay network 30). Control plane learning VTEPs, such as other leaf switches 22 in overlay network 30, not on the VTEP peer whitelist are considered invalid or un-authorized sources. For example, if leaf switch 22(1) has not received reachability information for leaf switch 22(2) through the control plane of overlay network 30, leaf switch 22(2) is not included on the VTEP peer list maintained by leaf switch 22(1), and leaf switch 22(1) will discard VXLAN network traffic received from leaf switch 22(2), which is considered an invalid VTEP. Accordingly, in the data plane, a control plane learning VTEP accepts VXLAN network traffic only from learned VTEPs (in other words, remote VTEP peers on the whitelist).

To facilitate inter-VXLAN network traffic (for example, network traffic to/from hosts 14 belonging to different VXLAN segments, such as VNI 10000 and VNI 20000), MP-BGP EVPN advertises Layer 3 reachability information for hosts 14 to ensure network traffic is routed through optimal paths. For example, overlay network 30 implements Layer 3 VNIs, described above, and VTEP MAC addresses for facilitating inter-VNI routing. Along with the IP address of remote VTEPs, BGP EVPN routes can also carry VTEP router MAC addresses. Each control plane learning VTEP has a router MAC address, which other control plane learning VTEPs can use as the inner destination MAC address when encapsulating inter-VNI network traffic to the control plane learning VTEP. Consider when host 14(3) belonging to VNI 20000 sends network traffic to host 14(1) belonging to VNI 10000. Host 14(3) sends a network packet to leaf switch 22(2) that includes Ethernet frames with inner header information that specifies an inner destination IP address for host 14(1) (here, 1.1.1.2/24) and an inner destination MAC address for its default gateway (which is a gateway MAC address for leaf switch 22(2)). Upon receiving the data packet, leaf switch 22(2) generates a VXLAN packet. Because the inner destination MAC address belongs to leaf switch 22(2), leaf switch 22(2) (referred to as an ingress control plane learning VTEP) routes the network packet to a Layer 3 VNI. For example, leaf switch 22(2) adds a VXLAN header, designating a Layer 3 VNI (here, VNI 50000) as the VXLAN network identifier, to the Ethernet frames and encapsulates the VXLAN header and Ethernet frames into a UDP payload. Leaf switch 22(2) then defines the inner header information and the outer IP header of the VXLAN packet. For example, leaf switch 22(2) sets the source IP address to VTEP2-IP (the IP address for leaf switch 22(2)), the destination IP address to VTEP3-IP (the IP address for leaf switch 22(3)), the inner source MAC address as a router MAC address for leaf switch 22(2), and the inner destination MAC address as a router MAC address for leaf switch 22(3). Leaf switch 22(2) sends the VXLAN packet over VNI 50000 through network 12 using the outer IP header, particularly, the destination IP address that specifies VTEP3-IP. When leaf switch 22(3) (referred to as an egress VTEP) receives the VXLAN packet, leaf switch 22(3) de-encapsulates the VXLAN packet (for example, by removing the Ethernet header, outer IP header, UDP header, and VXLAN header from the Ethernet frames). Based on the Layer 3 VNI, leaf switch 22(3) determines which tenant VRF to route the network packet, and forwards the network packet to host 14(1). Using Layer 3 VNIs, ingress control plane learning VTEPs do not need to know a destination VNI (such as VNI 10000) for inter-VNI routing. Accordingly, control plane learning VTEPs do not need to learn and maintain reachability information (such as MAC addresses) for the hosts 14 belonging to VNIs for which it does not have local hosts.

Typically, when operating with a control plane, overlay network 30 assumes all VTEPs (such as leaf switches 22(1)-22(4)) are control plane learning VTEPs that use Route Type 2 messages to learn reachability information for hosts operating behind remote VTEPs (where the Route Type 2 message includes IP-to-MAC bindings for the hosts, along with IP addresses for the remote VTEP behind which the hosts operate) and Route Type 3 messages to discover peer VTEPs belonging to associated VNIs. Since control plane learning VTEPs govern forwarding state information based on reachability information gleaned from the MP-BGP EVPN control plane, control plane learning VTEPs disable Layer 2 (MAC) learning for VXLAN network traffic received in the data plane (for example, control plane learning VTEPs often disable Layer 2 learning on ports over which it receives VXLAN network traffic). Then, when a control plane learning VTEP receives VXLAN network traffic from an unknown VTEP (in other words, not learned through the control plane), the control plane learning VTEP drops VXLAN network traffic received from the unknown VTEP. Though such mechanism is typically viewed as an enhanced security feature, many network environments include leaf switches that support overlay networks, such as overlay network 30, yet lack functionality required to operate with a control plane, such as the MP-BGP EVPN control plane. In addition, such leaf switches support only Layer 2 VXLAN gateway functionality, which is typically governed by what a routing/forwarding application specific integrated circuit (ASIC) of the leaf switch can support. In other words, as overlay network technology evolves, existing overlay network deployments include switches that cannot support Layer 3 gateway functionality to facilitate control plane based learning. However, to ensure existing overlay network deployments can seamlessly transition from data plane based learning to control plane based learning, solutions are needed for facilitating interoperability between control plane learning VTEPs and data plane learning VTEPs, such that network traffic to and from data plane learning VTEPs can be forwarded in overlay network environments.

Communication system 10 is configured to address the issues described above (and others) in offering a system and method for enabling interoperability between data plane learning endpoints and control plane learning endpoints in an overlay network environment, such as a VXLAN network environment. Embodiments of communication system 10 present control plane learning VTEPs that are configured with dual learning modes, operating in data plane learning mode when communicating with hosts behind data plane learning VTEPs and operating in control plane learning mode when communicating with hosts behind control plane learning VTEPs. Control plane learning VTEPs configured with dual learning modes facilitate Layer 2 interoperability between data plane learning VTEPs and control plane learning VTEPs in overlay networks, such as VXLAN networks. Embodiments of communication system 10 further designate at least one control plane learning VTEP as an anchor node responsible for routing network traffic between overlay segments, such as different VXLAN segments, and/or overlays, such as different VXLAN overlays, to and from hosts behind data plane learning VTEPs. The anchor nodes facilitate Layer 3 interoperability between data plane learning VTEPs and control plane learning VTEPs in overlay networks.

Deploying control plane learning VTEPs with the enhancements described herein allows overlay networks operating with a control plane to interoperate with overlay networks operating without a control plane, along with allowing switches that only support Layer 2 gateway functionality to interoperate with switches that support Layer 3 gateway functionality. Such approach provides an overlay network solution for effectively and gradually migrating existing overlay network deployments that employ predominantly data plane based learning to a completely control plane based learning overlay network deployment without having to rip and replace the existing overlay network deployments. Since the enhanced control plane learning VTEPs described herein retain control plane learning behavior when communicating with hosts behind control plane learning VTEPs, embodiments described herein ensure that control plane learning VTEPs retain advantages offered by overlay networks operating with a control plane (for example, ARP suppress features and/or unknown unicast suppress features), while also ensuring control plane learning VTEPs recognize data plane learning VTEPs and hosts operating behind the data plane learning VTEPs. Further, deploying control plane learning VTEPs with the enhancements described herein supports all models for handling multi-destination network traffic, including multicasting models and/or ingress replication based models. Different embodiments may have different advantages than described herein, and no particular advantage is necessarily required of any of the embodiments described herein.

Figure 2:
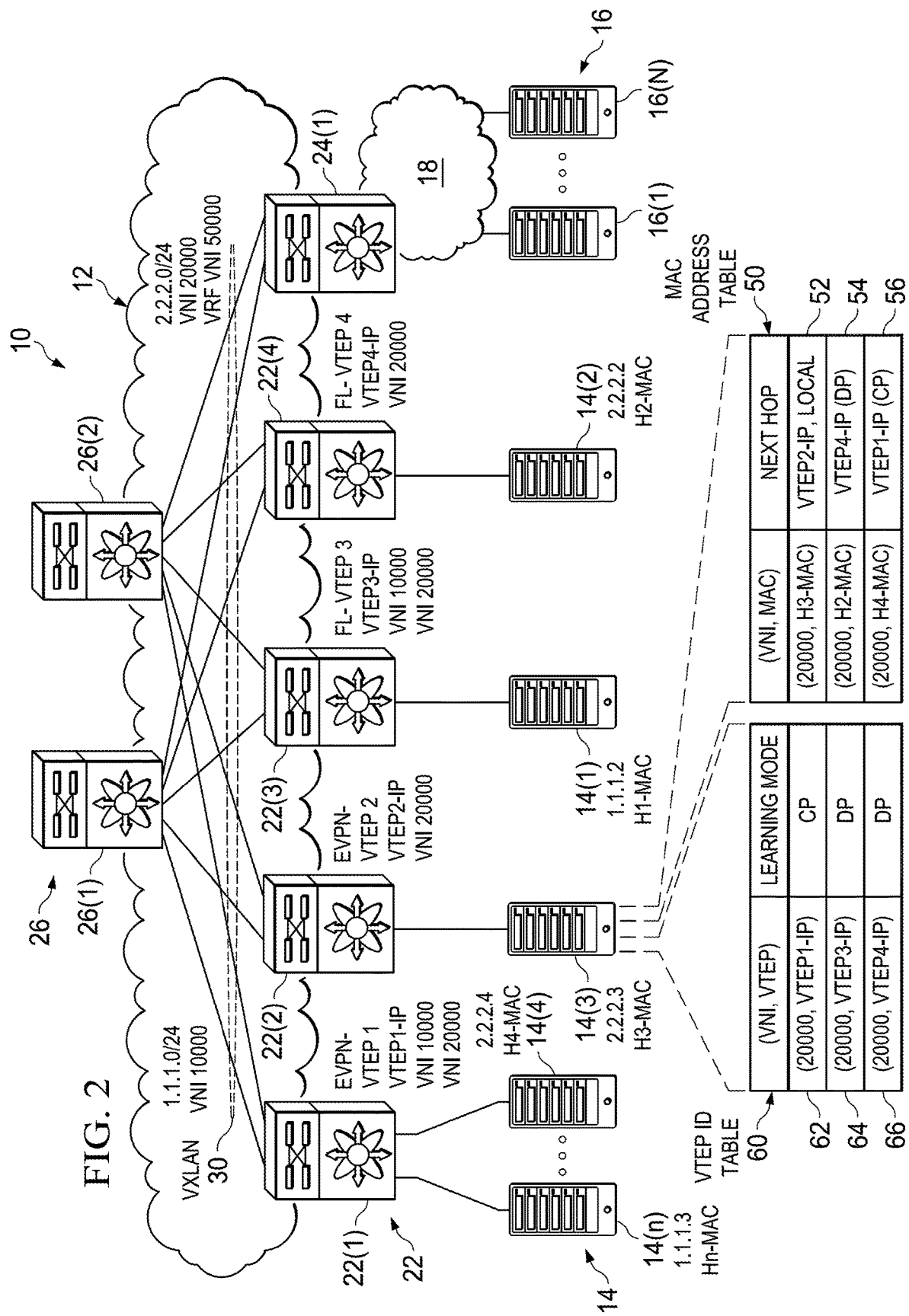
FIG. 2 is a simplified schematic block diagram illustrating the communication system for enabling interoperability between data plane learning endpoints and control plane learning endpoints in the network environment.

Turning to FIG. 2, communication system 10 enables Layer 2 interoperability between data plane learning VTEPs and control plane learning VTEPs in overlay network 30. In FIG. 2, overlay network 30 is configured with control plane learning VTEPs and data plane learning VTEPs. For example, leaf switch 22(1) and leaf switch 22(2) are configured as control plane learning VTEPs (also referred to as EVPN-capable VTEPs or EVPN VTEPs) and leaf switch 22(3) and leaf switch 22(4) are configured as data plane learning VTEPs (also referred to as FL-capable VTEPs or FL VTEPs). For a given VXLAN segment, data plane learning VTEPs and control plane learning VTEPs share a multicast group. For example, for VNI 20000, leaf switches 22(1)-22(4) will join VXLAN multicast group A in network 12 having IP multicast group address A, and leaf switches 22(1)-22(4) will receive network traffic destined for IP multicast group address A, irrespective of how leaf switches 22(1)-22(4) are configured for learning reachability information for remote hosts and/or remote VTEPs. Accordingly, multi-destination traffic (such as BUM traffic) originating in VNI 20000 from one type of VTEPs, such as leaf switch 22(3) and leaf switch 22(4), is transparently forwarded to other types of VTEPs, such as leaf switch 22(1) and leaf switch 22(2), and vice-versa. However, as noted above, since control plane learning VTEPs cannot discover data plane learning VTEPs through the control plane, control plane learning VTEPs will typically drop any VXLAN packets received from the data plane learning VTEPs. The present disclosure proposes various enhancements to control plane learning VTEPs, such as leaf switch 22(1) and leaf switch 22(2), to ensure Layer 2 interoperability and Layer 3 interoperability for control plane learning VTEPs with data plane learning VTEPs. Such enhancements do not affect behavior of data plane learning VTEPs, such as leaf switch 22(3) and leaf switch 22(4), which continue to perform flood-and-learn operations for discovering remote VTEPs and remote hosts as described above.

To facilitate Layer 2 interoperability between control plane learning VTEPs (such as leaf switch 22(1) and leaf switch 22(2)) and data plane learning VTEPs (such as leaf switch 22(3) and leaf switch 22(4)), control plane learning VTEPs are configured with dual learning modes, operating in data plane learning mode when communicating with hosts 14 behind data plane learning VTEPs and operating in control plane learning mode when communicating with hosts 14 behind control plane learning VTEPs. To operate in dual learning mode, control plane learning VTEPs are configured to de-encapsulate all VXLAN packets received from VTEPs belonging to overlay network 30, even VXLAN packets received from unknown VTEPs (for example, VTEPs not included on a white list maintained at a control plane learning VTEP). In FIG. 2, leaf switch 22(1) and leaf switch 22(2) de-encapsulate all VXLAN packets received from VTEPs, even VXLAN packets received from data plane learning VTEPs that leaf switch 22(1) and leaf switch 22(2) have not discovered through the control plane of overlay network 30, such as leaf switch 22(3) and leaf switch 22(4). Leaf switch 22(1) and leaf switch 22(2) thus initially operate in a data plane learning mode (also referred to as Layer 2 or MAC learning mode), learning reachability information for remote VTEPs and remote hosts in the data plane. For example, as leaf switch 22(1) and leaf switch 22(2) receive VXLAN packets from overlay network 30, leaf switch 22(1) and leaf switch 22(2) de-encapsulate each VXLAN packet (for example, by removing the Ethernet header, outer IP header, UDP header, and VXLAN header from the Ethernet frames) and learn reachability information for a remote host originating the VXLAN packet, along with a remote VTEP through which the remote host is reachable in network 12. For example, similar to flood-and-learn VTEPs, when leaf switch 22(2) has never received a VXLAN packet from a given remote host, leaf switch 22(2) de-encapsulates the VXLAN packet, learns a MAC address for the remote host from the source MAC address specified in the inner MAC header of the VXLAN packet, and learns an IP address for a remote VTEP from the source IP address specified in the outer IP header of the VXLAN packet. Leaf switch 22(2) then stores reachability information for the remote host in a routing table, such as a routing table 50 (also referred to as a Layer 2 table or a MAC address table). In FIG. 2, routing table 50 maps Layer 2 MAC addresses of hosts to a next hop in network 12, provided by Layer 3 IP addresses of VTEPs through which the hosts connect to network 12. For example, routing table 50 includes entries for hosts belonging to VNI 20000, such as an entry 52 that maps a MAC address for host 14(3) (here, H3-MAC) to leaf switch 22(2) (here, VTEP2-IP), an entry 54 that maps a MAC address for host 14(2) (here, H2-MAC) to leaf switch 22(4) (here, VTEP4-IP), and an entry 56 that maps a MAC address for host 14(4) (here, H4-MAC) to leaf switch 22(1) (here, VTEP1-IP). By de-encapsulating VXLAN packets received from all VTEPs, control plane learning VTEPs discover data plane learning VTEPs in overlay network 30. For example, typically, leaf switch 22(2) would drop VXLAN packets received from leaf switch 22(4) since leaf switch 22(2) had not discovered leaf switch 22(4) through the control plane of overlay network 30. However, in FIG. 2, since leaf switch 22(2) de-encapsulates VXLAN packets received from all VTEPs in overlay network 30, leaf switch 22(2) discovers leaf switch 22(4) (a data plane learning VTEP) and learns reachability information for leaf switch 22(4) and host 14(2) operating behind leaf switch 22(4).

Control plane learning VTEPs are further configured to track a learning mode of discovered VTEPs, allowing a control plane learning VTEP to operate in data plane learning mode when communicating with data plane learning VTEPs and control plane learning mode when communicating with control plane learning VTEPs. Operating in dual learning modes ensures that control plane learning VTEPs still realize advantages and benefits gained by using the control plane, particularly the MP-BGP EVPN control plane, as a single source of truth for learning and forwarding operations, while allowing control plane learning VTEPs to learn reachability information for data plane learning hosts and hosts operating behind data plane learning VTEPs. When operating in data plane learning mode, a control plane learning VTEP enables Layer 2 (MAC) learning, such that the control plane learning VTEP de-encapsulates VXLAN packets received from a data plane learning VTEP, learns reachability information for remote VTEPs from outer header information (such as the source IP address) in the de-encapsulated VXLAN packets, learns reachability information for remote hosts from inner MAC header information (such as the inner source MAC address) in the de-encapsulated VXLAN packets, and forwards data (such as Ethernet frames) from the de-encapsulated VXLAN packets to their destination based on the inner MAC header information. When operating in control plane learning mode, the control plane learning VTEP disables Layer 2 (MAC) learning, such that the control plane learning VTEP de-encapsulates VXLAN packets received from a control plane learning VTEP and forwards data (such as Ethernet frames) from the de-encapsulated packets to their destination based on inner MAC header information found in the de-encapsulated VXLAN packets, yet learns reachability information for remote VTEPs and remote hosts in the control plane (for example, via Route Type 2 messages and/or Route Type 3 messages). In this way, for a given VNI (such as VNI 20000), hosts 14 operating behind control plane learning VTEPs can seamlessly communicate with hosts 14 operating behind data plane learning VTEPs in communication system 10, achieving Layer 2 interoperability.

For example, in FIG. 2, leaf switch 22(2) builds a VTEP learning mode table 60 as leaf switch 22(2) discovers VTEPs in overlay network 30, where each learned VTEP entry installed by leaf switch 22(2) indicates a learning mode of the learned VTEP. Regular aging semantics apply for discovered data plane learning VTEPs. VTEP learning mode table 60 indicates learning modes for remote VTEPs belonging to VNI 20000 discovered by leaf switch 22(2) in overlay network 30. For example, VTEP learning mode table 60 includes an entry 62 that indicates leaf switch 22(1) (here, VTEP1-IP) is a control plane learning VTEP, an entry 64 that indicates leaf switch 22(3) (here, VTEP3-IP) is a data plane learning VTEP, and an entry 66 that indicates leaf switch 22(4) (here, VTEP4-IP) is a data plane learning VTEP. Leaf switch 22(2) then operates in control plane learning mode or data plane learning mode based whether a VXLAN packet is received from a data plane learning VTEP or a control plane learning VTEP. For example, when leaf switch 22(2) receives a VXLAN packet from leaf switch 22(1), leaf switch 22(2) de-encapsulates the VXLAN packet and forwards the VXLAN packet to the destination specified in the de-encapsulated VXLAN packet (for example, specified in the inner destination MAC address). In contrast, when leaf switch 22(2) receives a VXLAN packet from leaf switch 22(4), leaf switch 22(2) de-encapsulates the VXLAN packet, performs Layer 2 learning on the de-encapsulated network packet (as described in detail above), and forwards the VXLAN packet to the destination specified in the de-encapsulated VXLAN packet (for example, specified in the inner destination MAC address).

A control plane learning VTEP designates a discovered VTEP as a control plane learning VTEP when the control plane learning VTEP receives network traffic from the discovered VTEP through the control plane of overlay network 30. For example, leaf switch 22(2) designates leaf switch 22(1) as a control plane learning VTEP when leaf switch 22(2) receives network traffic from leaf switch 22(1) through the MP-BGP EVPN control plane of overlay network 30, such as a Route Type 2 and/or Route Type 3 message. In some implementations, leaf switch 22(2) initially discovers leaf switch 22(1) through the control plane (for example, when leaf switch 22(1) sends a Route Type 2 message with reachability information for host 14(4)), such that leaf switch 22(2) initially designates leaf switch 22(1) as a control plane learning VTEP in entry 62 and disables Layer 2 (MAC) learning for VXLAN packets received from leaf switch 22(1). In some implementations, leaf switch 22(2) initially discovers leaf switch 22(1) through the data plane, such that leaf switch 22(2) initially designates leaf switch 22(1) as a data plane learning VTEP in entry 62. For example, since data plane communications are typically faster than control plane communications, leaf switch 22(2)

may receive network traffic from host 14(4) via leaf switch 22(1), such as an ARP request for host 14(3), before leaf switch 22(2) discovers leaf switch 22(1) in the control plane. Leaf switch 22(2) thus discovers leaf switch 22(1) in the data plane and designates leaf switch 22(1) as a data plane learning VTEP. Then, once leaf switch 22(2) receives network traffic from leaf switch 22(1) through the MP-BGP EVPN control plane, leaf switch 22(2) updates entry 62 to reflect that leaf switch 22(1) is a control plane learning VTEP and disables Layer 2 learning for VXLAN packets thereafter received from leaf switch 22(1).

Figure 3:
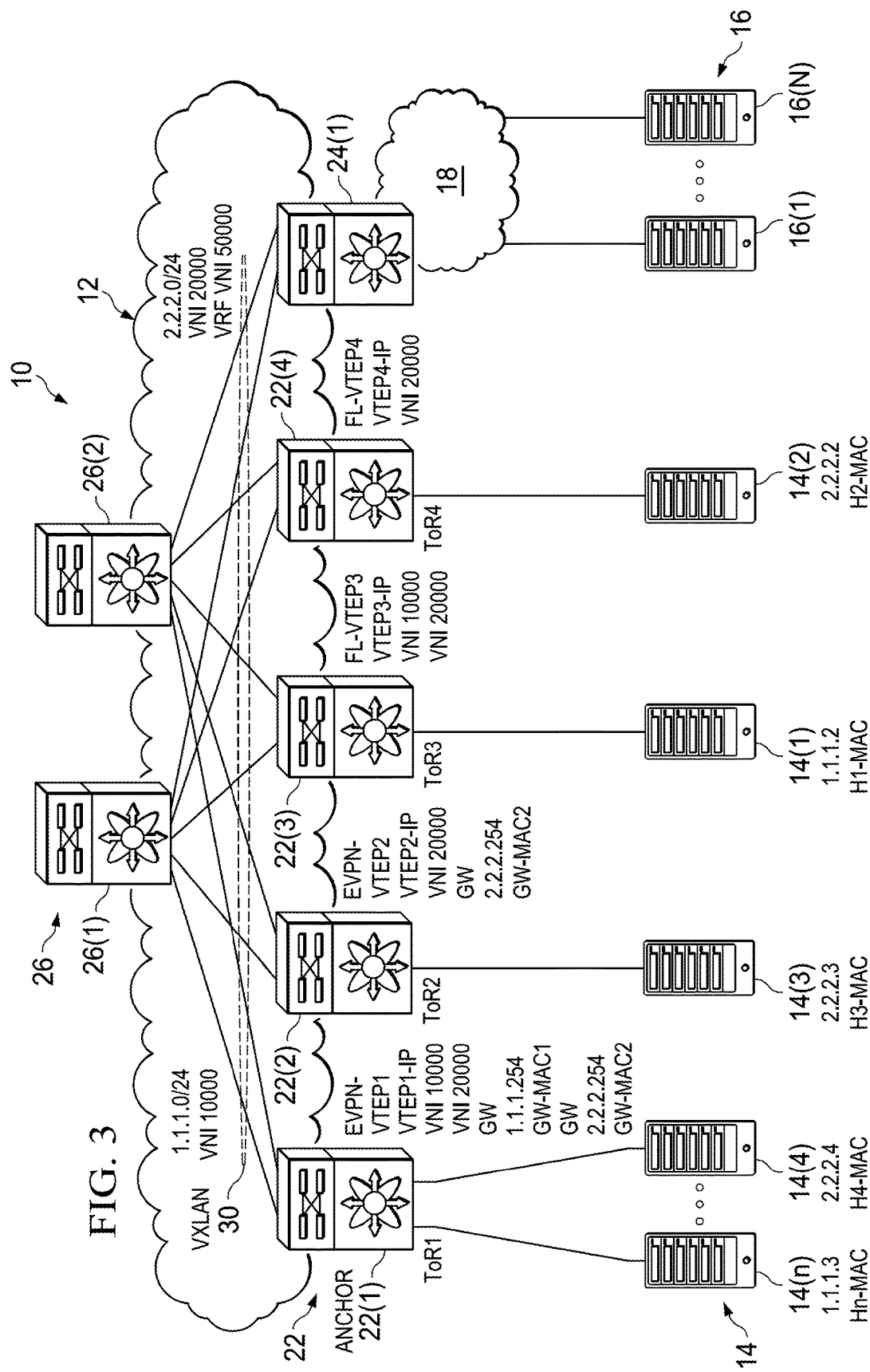
FIG. 3 is a simplified block diagram illustrating example details of the communication system in accordance with various embodiments.

Turning to FIG. 3, communication system 10 enables Layer 3 interoperability between data plane learning VTEPs and control plane learning VTEPs in overlay network 30. For control plane learning VTEPs, MP-BGP EVPN facilitates distributed anycast gateway functionality, where a host belonging to a given IP subnet can use its local control plane learning VTEP as a default gateway for sending network traffic to a host belonging to a different IP subnet, enabling optimal routing and forwarding in overlay network 30. Control plane learning VTEPs participating in a given VNI associated with the given IP subnet are assigned the same virtual gateway IP address and the same virtual gateway MAC address to enable distributed anycast gateway functionality for hosts locally attached thereto. In FIG. 3, control plane learning VTEPs are configured as EVPN distributed anycast gateways. For example, leaf switch 22(1) and leaf switch 22(2) are configured as EVPN distributed anycast gateways for VNI 20000 (assigned to subnet 2.2.2.0/24), where leaf switch 22(1), leaf switch 22(2), and any other leaf switches 22 belonging to VNI 20000 are assigned the same anycast gateway virtual IP address (here, anycast gateway virtual IP address 2.2.2.254) and the same anycast gateway virtual MAC address (here, GW-MAC2). Leaf switch 22(1) is also configured as an EVPN distributed anycast gateway for VNI 10000 (assigned to subnet 1.1.1.0/24), where leaf switch 22(1) and any other leaf switches 22 belonging to VNI 10000 are assigned the same anycast gateway virtual IP address (here, anycast gateway virtual IP address 1.1.1.254) and the same anycast gateway virtual MAC address (here, GW-MAC1). With distributed anycast gateway functionality, each participating control plane learning VTEP resolves ARP requests for the default gateway from hosts locally attached thereto and prevents the ARP requests from flooding network 12 (in other words, drops the ARP requests). In this way, each control plane learning VTEP acts as a first hop router for inter-VNI network traffic from locally attached hosts. For example, leaf switch 22(1) resolves ARP requests for the default gateway from locally attached hosts 14 belonging to IP subnet 1.1.1.0/24, such as host 14(n), and ARP requests for the default gateway for locally attached hosts belonging to IP subnet 2.2.2.0/24, such as host 14(4). Similarly, leaf switch 22(2) resolves ARP requests for the default gateway from locally attached hosts 14 belonging to IP subnet 2.2.2.0/24, such as host 14(3). For example, when leaf switch 22(2) receives an ARP request from host 14(3) for the default gateway, leaf switch 22(2) drops the ARP request (preventing the ARP request from flooding network 12) and sends an ARP reply to host 14(3) that defines the source MAC address as the any cast gateway virtual MAC address for IP subnet 2.2.2.0/24 (here, GW-MAC2). Then, when host 14(3) sends network traffic to a host belonging to a different VNI (such as host 14(n) belonging to VNI 10000), host 14(3) sends leaf switch 22(2) a network packet that specifies GW-MAC2 (the anycast gateway virtual MAC address for IP subnet 2.2.2.0/24) as the destination MAC address, and leaf switch 22(2) knows to perform forwarding/routing operations to transport the network traffic between VNIs.

For data plane learning VTEPs (here, leaf switch 22(3) and leaf switch 22(4)), which possess only Layer 2 gateway functionality, for a given VNI, overlay network 30 designates at least one control plane learning VTEP as an anchor node for enabling inter-VNI network traffic to/from hosts 14 behind the data plane learning VTEPs. Logically, the anchor node serves as a point of connectivity between data plane learning VTEPs and control plane learning VTEPs for inter-VNI network traffic. The anchor node is a control plane learning VTEP configured to resolve ARP requests for the default gateway from hosts locally attached thereto, along with ARP requests for the default gateway from hosts operating behind data plane learning VTEPs. Essentially, overlay network 30 steers all inter-VNI network traffic originating from hosts operating behind data plane learning VTEPs to the anchor node, which takes on ARP responsibilities related to resolving the default gateway for hosts operating behind the data plane learning VTEPs. Since the anchor node learns reachability information for the hosts operating behind data plane learning VTEPs while resolving the ARP requests for the default gateway, the anchor node is also responsible for injecting the reachability information for the learned hosts operating behind data plane learning VTEPs into the control plane. For example, the anchor node can forward a Route Type 2 message with the learned hosts reachability information through the MP-BGP EVPN control plane to other control plane learning VTEPs in overlay network 30, ensuring that other control plane learning VTEPs have Layer 3 reachability information for the hosts operating behind the data plane learning VTEPs. However, to maintain optimal bridging and/or Layer 2 reachability within the given VNI, the anchor node does not inject any MAC routes into the control plane for hosts learned over core ports. For example, in some implementations, the anchor node advertises IP addresses, but not MAC addresses, for hosts operating behind data plane learning endpoints in the control plane to ensure Layer 3 reachability, while allowing control plane learning VTEPs and data plane learning VTEPs to learn Layer 2 reachability information (MAC addresses) for hosts operating behind data plane learning endpoints in the data plane. As such, Layer 2 connectivity to hosts operating behind data plane learning endpoints is achieved without detouring to and traversing the anchor node. Furthermore, the anchor node discriminates between hosts learnt on its core facing ports (in other words, hosts learned in the data plane (using flood-and-learn mechanisms) from other VTEPs) and hosts learnt on its access facing ports (in other words, directly connected hosts), such that the anchor node injects MAC addresses for directly connected hosts into the control plane but does not inject MAC addresses for hosts learned in the data plane from other VTEPs. In some implementations, for redundancy purposes, the anchor node is a virtual port-channel (vPC) control plane learning VTEP, which is a pair of vPC leaf switches 22 that share the same VTEP address, often referred to as an anycast VTEP address, and function as a logical control plane learning VTEP. Other VTEPs in overlay network see the leaf switches as a single control plane learning VTEP with the anycast VTEP address. Each leaf switch of the vPC control plane learning VTEP load share in an active-active configuration, such that if one vPC leaf switch goes down, the other vPC leaf switch takes over the entire traffic load, ensuring that a failure event will not cause network connectivity loss to network elements (such as hosts 14 and leaf switches 22) connected to the vPC pair.

In FIG. 3, leaf switch 22(1) is designated as the anchor node for enabling inter-VNI network traffic to/from hosts 14 behind leaf switch 22(3) and leaf switch 22(4). For example, consider when host 14(1) sends an ARP request for the default gateway to leaf switch 22(3). Assuming leaf switch 22(3) does not yet know a gateway MAC address for the default gateway, leaf switch 22(3) encapsulates the ARP request in an IP multicast VXLAN packet and forwards the IP multicast VXLAN packet to the VXLAN multicast group A. For example, the IP multicast VXLAN packet encapsulates the ARP request in a UDP payload (along with VNI 10000 and an inner MAC header that designates H1-MAC as the inner source MAC address) with an outer IP header that specifies VTEP3-IP as the source IP address and IP multicast group address A as the destination IP address. The IP multicast VXLAN packet is then distributed to all members of VXLAN multicast group A (here, leaf switches 22(1)-22(4)). Each member of the VXLAN multicast group A de-encapsulates the IP multicast VXLAN packet and checks the VXLAN header for the VNID (here, identifying VNI 10000). Since leaf switch 22(2) and leaf switch 22(4) are not members of VNI 10000, leaf switch 22(2) and leaf switch 22(4) drop the IP multicast VXLAN packet. Since leaf switch 22(1) is a member of VNI 10000, leaf switch 22(1) learns an IP address of leaf switch 22(3) (here, VTEP3-IP) from the source IP address defined in the outer IP address header of the IP multicast VXLAN packet, along with a MAC address for host 14(1) (here, H1-MAC) specified in the ARP request of the IP multicast VXLAN packet. Leaf switch 22(1) can then generate an entry that maps VNI 10000 and H1-MAC to VTEP3-IP in its routing table, along with an entry that indicates VTEP3-IP operates in the data plane learning mode in its VTEP ID table. Since leaf switch 22(1) is configured as the anchor node for overlay network 30, leaf switch 22(1) generates an ARP reply. For example, leaf switch 22(1) encapsulates the ARP reply in a VXLAN packet and forwards the VXLAN packet to leaf switch 22(3). The VXLAN packet encapsulates the ARP reply in a UDP payload and designates VNI 10000 as the VXLAN segment in the VXLAN header, GW-MAC1 (the any cast gateway virtual MAC address for IP subnet 1.1.1.0/24) as the source MAC address in the inner MAC header, and H1-MAC as the destination MAC address in the inner MAC header. Leaf switch 22(1) also designates VTEP1-IP as the source IP address and VTEP3-IP as the destination IP address in the outer header. Then, leaf switch 22(1) sends the VXLAN packet with the encapsulated ARP reply to leaf switch 22(3), which de-encapsulates the VXLAN packet and forwards the ARP reply to host 14(1) using H1-MAC, the destination MAC address for host 14(1) specified in the inner MAC header of the VXLAN packet. Host 14(1) then learns reachability information for the default gateway. Based on the ARP reply, leaf switch 22(3) also learns reachability information for the anchor node, such that leaf switch 22(3) can generate an entry in a routing/forwarding table that maps VTEP1-IP (the IP address of leaf switch 22(1)) to GW-MAC1 (the any cast gateway virtual MAC address for IP subnet 1.1.1.0/24). Then, when host 14(1) sends network traffic to a host belonging to a different VNI (such as host 14 belonging to VNI 20000), host 14(1) sends leaf switch 22(3) a network packet that specifies GW-MAC1 (the anycast gateway virtual MAC address for IP subnet 1.1.1.0/24) as the destination MAC address, and leaf switch 22(3) knows to forward the network packet to the anchor node, leaf switch 22(1) for routing the network traffic between VNIs. In this way, leaf switch 22(1) (the anchor node) handles routing for all inter-VNI network traffic to/from host 14(1) and any other host 14 below leaf switch 22(3), such that leaf switch 22(1) becomes the a first hop router for hosts behind leaf switch 22(3) (a data plane learning VTEP).

Anchor nodes in overlay network 30 facilitate communication between hosts 14 belonging to different VXLAN segments, where both hosts 14 operate behind data plane learning VTEPs. For example, leaf switch 22(1) facilitates communication between host 14(1) belonging to VNI 10000 (and operating behind leaf switch 22(3)) and host 14(2) belonging to VNI 20000 (and operating behind leaf switch 22(4)). In FIG. 3, as illustrated by a sample packet flow 80, when host 14(1) (having IP address 1.1.1.2/24) sends network traffic to host 14(2), host 14(1) sends a network packet to leaf switch 22(3) that includes Ethernet frames with inner header information that specifies an inner destination IP address for host 14(2) (here, 2.2.2.2/24) and an inner destination MAC address for its default gateway (here, GW-MAC1). Upon receiving the data packet, leaf switch 22(3) generates a VXLAN packet. For example, leaf switch 22(3) adds a VXLAN header, designating VNI 10000 as the VXLAN network identifier, to the Ethernet frames and encapsulates the VXLAN header and Ethernet frames into a UDP payload. Based on the inner destination MAC address, leaf switch 22(3) identifies leaf switch 22(1) as a destination for the network packet (for example, by mapping GW-MAC1 (the anycast gateway virtual MAC address for 1.1.1.0/24) to an IP address for an anchor node responsible for routing inter-VNI network traffic to/from VNI 10000 (here, VTEP1-IP for leaf switch 22(1)). Leaf switch 22(3) then defines an outer IP header of the VXLAN packet, setting a source IP address to an IP address for leaf switch 22(3) (here, VTEP3-IP) and a destination IP address to VTEP1-IP (the IP address for leaf switch 22(1)). Leaf switch 22(3) sends the VXLAN packet over VNI 10000 through network 12 using the outer IP header, particularly, the destination IP address that specifies VTEP1-IP. Essentially, communication system 10 is configured to initially direct inter-VNI network traffic from host 14(1) to the anchor node, leaf switch 22(1), via a bridging hop (here, leaf switch 22(3)) in ingress VNI 10000.

When leaf switch 22(1) receives the VXLAN packet, leaf switch 22(1) de-encapsulates the VXLAN packet (for example, by removing the Ethernet header, outer IP header, UDP header, and VXLAN header from the Ethernet frames) and re-encapsulates the VXLAN packet. For example, leaf switch 22(1) adds a VXLAN header, designating VNI 20000 as the VXLAN network identifier, to the Ethernet frames and encapsulates the VXLAN header and Ethernet frames into a UDP payload. Leaf switch 22(1) also identifies leaf switch 22(4) as a destination for the data packet (for example, using tables that map the IP address of host 14(2) to H2-MAC and leaf switch 22(4)), identifies an IP address for leaf switch 22(4), and then defines inner header information and the outer IP header of the VXLAN packet. For example, leaf switch 22(1) sets the inner source MAC address to GW-MAC 1 (the anycast gateway virtual MAC address for 1.1.1.0/24), the inner destination MAC address to H2-MAC (the MAC address for host 14(2)), the source IP address of the outer IP header to VTEP1-IP (the IP address for leaf switch 22(1)), and the destination IP address of the outer IP header to VTEP4-IP (the IP address for leaf switch 22(4)). Leaf switch 22(1) then sends the VXLAN packet over VNI 20000 through network 12 using the destination IP address specified in the outer IP header (here, VTEP4-IP). Essentially, once received at the anchor node, communication system 10 is configured to direct the inter-VNI network traffic from the anchor node (here, leaf switch 22(1)) to its destination (here, host 14(2)) via a bridging hop (here, leaf switch 22(4)) in egress VNI 20000. When leaf switch 22(4) receives the VXLAN packet, leaf switch 22(4) de-encapsulates the VXLAN packet and forwards the Ethernet frames to host 14(2) using H2-MAC, the destination MAC address specified in the inner MAC header of the VXLAN packet.

Anchor nodes also facilitate communication between hosts 14 belonging to different VXLAN segments, where one host 14 operates behind a data plane learning VTEP and another host 14 operates behind a control plane learning VTEP. For example, leaf switch 22(1) facilitates communication between host 14(3) belonging to VNI 20000 (and operating behind leaf switch 22(2)) and host 14(1) belonging to VNI 10000 (and operating behind leaf switch 22(3)). In FIG. 3, as illustrated by a sample packet flow 90, when host 14(3) (having IP address 2.2.2.3/24) sends network traffic to host 14(1), host 14(3) sends a network packet to leaf switch 22(2) that includes Ethernet frames with inner header information that specifies an inner destination IP address for host 14(1) (here, 1.1.1.2/24) and an inner destination MAC address for its default gateway (here, GW-MAC2). Upon receiving the data packet, leaf switch 22(2) generates a VXLAN packet. For example, leaf switch 22(2) adds a VXLAN header, designating a Layer 3 VNI (here, VNI 50000) as the VXLAN network identifier, to the Ethernet frames and encapsulates the VXLAN header and Ethernet frames into a UDP payload. Based on the inner header information, leaf switch 22(2) identifies leaf switch 22(1), an anchor node responsible for routing inter-VNI network traffic, as a destination for the network packet. Leaf switch 22(2) can map a router MAC address for leaf switch 22(1) to an IP address for leaf switch 22(1) (here, VTEP1-IP). Leaf switch 22(2) then defines the inner header information and the outer IP header of the VXLAN packet. For example, leaf switch 22(2) sets the source IP address to VTEP2-IP (the IP address for leaf switch 22(2)), the destination IP address to VTEP1-IP (the IP address for leaf switch 22(1)). Leaf switch 22(2) sends the VXLAN packet over VNI 50000 through network 12 using the outer IP header, particularly, the destination IP address that specifies VTEP1-IP. Essentially, communication system 10 is configured to initially direct inter-VNI network traffic from host 14(3) to the anchor node, leaf switch 22(1), via a bridging hop (here, leaf switch 22(2)) in ingress VNI 50000.

When leaf switch 22(1) receives the VXLAN packet, leaf switch 22(1) de-encapsulates the VXLAN packet (for example, by removing the Ethernet header, outer IP header, UDP header, and VXLAN header from the Ethernet frames) and re-encapsulates the VXLAN packet. For example, leaf switch 22(1) adds a VXLAN header, designating VNI 10000 as the VXLAN network identifier, to the Ethernet frames and encapsulates the VXLAN header and Ethernet frames into a UDP payload. Leaf switch 22(1) also identifies leaf switch 22(3) as a destination for the data packet (for example, using tables that map the IP address of host 14(1) to H1-MAC and leaf switch 22(3)), identifies an IP address for leaf switch 22(3), and then defines the inner header information and the outer IP header of the VXLAN packet. For example, leaf switch 22(1) sets the inner source MAC address to GW-MAC2 (the anycast gateway virtual MAC address for 2.2.2.0/24), the inner destination MAC address to H1-MAC (the MAC address for host 14(1)), the source IP address of the outer IP header to VTEP1-IP (the IP address for leaf switch 22(1)), and the destination IP address of the outer IP header to VTEP3-IP (the IP address for leaf switch 22(3)). Leaf switch 22(1) then sends the VXLAN packet over VNI 10000 through network 12 using the destination IP address specified in the outer IP header (here, VTEP3-IP). Essentially, once received at the anchor node, communication system 10 is configured to direct the inter-VNI network traffic from the anchor node (here, leaf switch 22(1)) to its destination (here, host 14(1)) via a bridging hop (here, leaf switch 22(3)) in egress VNI 10000. When leaf switch 22(3) receives the VXLAN packet, leaf switch 22(3) de-encapsulates the VXLAN packet and forwards the Ethernet frames to host 14(1) using H1-MAC, the destination MAC address specified in an inner MAC header of the VXLAN packet.

Anchor nodes also update reachability information in the control plane for hosts moving between control plane learning VTEPs and data plane learning VTEPs. In some implementations, anchor nodes use a MAC mobility extended community attribute, which is advertised with a Route type 2 message (MAC/IP advertisement routes), to ensure that control plane learning VTEPs retain correct MAC/IP routes for hosts moving between control plane learning VTEPs and data plane learning VTEPs. In some implementations, the MAC mobility extended community attribute includes a sequence number, which anchor nodes can update to reflect that a host has a new MAC/IP route. In some implementations, when a control plane learning VTEP advertises a host's MAC address for the first time, no MAC mobility extended community can accompany the route advertisement (specifically, the Route Type 2 message). In some implementations, when a control plane learning VTEP re-advertises the host's MAC address, the control plane learning VTEP can update a sequence number of the MAC mobility extended community, indicating that previously advertised MAC/IP routes for the host are no longer valid. In some implementations, when a control plane learning VTEP receives a Route Type 2 message having an updated sequence number for a host's MAC address that the control plane learning VTEP previously advertised, the control plane learning VTEP withdraws the previously advertised Route Type 2 message. To accomplish such mechanisms, in some implementations, anchor nodes do not discriminate between hosts 14 moving within network 12 and hosts 14 newly connecting to network 12. Both scenarios can be treated equally, which can substantially reduce unknown unicast flooding.

Consider where host 14(3) moves from leaf switch 22(2) (a control plane learning VTEP) to leaf switch 22(3) (a data plane learning VTEP), and no trigger exists for leaf switch 22(2) to withdraw its previously advertised route for host 14(3) (which provides reachability to host 14(3) at leaf switch 22(2)). Initially, host 14(3) locally attaches to leaf switch 22(2), leaf switch 22(2) learns an IP-to-MAC binding for host 14(3) (here, mapping an IP address of 2.2.2.3/24 to a MAC address of H3-MAC), and leaf switch 22(2) transmits a route advertisement (for example, a Route Type 2 message) to all control plane learning VTEPs belonging to the same VXLAN segment (here, leaf switch 22(1) belonging to VNI 20000). The route advertisement can define a route type as a MAC/IP advertisement route, an Ethernet tag ID as a VXLAN identifier of the VXLAN segment (here, VNI 20000), a MAC address of host 14(3) (here, H3-MAC), an IP address of host 14(3) (here, 2.2.2.3/24), and a next hop as leaf switch 22(4) (here, VTEP4-IP, the IP address of leaf switch 22(4)). Because the MAC address for host 14(3) is advertised for the first time in the control plane, leaf switch 22(2) does not include a MAC mobility extended community with the route advertisement, and a sequence number associated with the route advertisement is assumed zero. In some implementations, leaf switch 22(2) includes a MAC mobility extended community in the route advertisement, where the sequence number is initialized to a given starting value. Upon receiving the route advertisement, leaf switch 22(1) can update forwarding information for host 14(3) and begin forwarding network traffic from respective locally attached hosts 14 to host 14(3).

When host 14(3) moves from leaf switch 22(2) (the control plane learning VTEP) to leaf switch 22(3) (a data plane learning VTEP), the anchor node learns that host 14(3) has moved through the data plane. For example, leaf switch 22(1) learns that host 14(3) is now operating behind leaf switch 22(3) (the data plane learning VTEP) when leaf switch 22(1) de-encapsulates a VXLAN packet originating from host 14(3) via the data plane, learning a MAC address for host 14(3) from the source MAC address specified in the inner MAC header of the VXLAN packet and an IP address for leaf switch 22(3) from the source IP address specified in the outer IP header of the VXLAN packet. Leaf switch 22(1) then transmits a update route advertisement (for example, a Route Type 2 message) to all control plane learning VTEPs belonging to the same VXLAN segment (here, leaf switch 22(2) belonging to VNI 20000). The update route advertisement can define a route type as a MAC/IP advertisement route, an Ethernet tag ID as a VXLAN identifier of the VXLAN segment (here, VNI 20000), a MAC address of host 14(3) (here, H3-MAC), an IP address of host 14(3) (here, 2.2.2.3/24), and a next hop as leaf switch 22(3) (here, VTEP3-IP, the IP address of leaf switch 22(3)). Because leaf switch 22(1) is re-advertising the MAC address for host 14(3) in the control plane, leaf switch 22(1) includes a MAC mobility extended community with the update route advertisement, where the MAC mobility extended community includes an updated sequence number (in some implementations, a sequence number greater than a sequence number associated with the most recent route advertisement providing the MAC address for host 14(3), such as the route advertisement received from leaf switch 22(2)).

In essence, since leaf switch 22(1) impersonates leaf switch 22(3) (the data plane learning VTEP) to update reachability information for host 14(3), leaf switch 22(1) can add a proxy community attribute (or some other valid tag) to the update route advertisement. Then, when a control plane learning VTEP receives the update route advertisement, the control plane learning VTEP knows that the update route advertisement is a proxy update route advertisement, leaf switch 22(1) is sending the update route advertisement on behalf of a data plane learning VTEP (in other words, the next hop specified in the update route advertisement), and the control plane learning VTEP will not erroneously add the data plane learning VTEP specified as the next hop to its list of control plane learning VTEPs. Upon receiving the route advertisement with an updated sequence number for the MAC address of host 14(3) (originally advertised by leaf switch 22(2)), leaf switch 22(2) learns updated reachability information for host 14(3), withdraws its originally advertised MAC-to-IP binding for host 14(3), and updates forwarding information for host 14(3). Based on the proxy community attribute in the proxy update advertisement, leaf switch 22(2) will not add leaf switch 22(3) to its list of control plane learning VTEPs. When leaf switch 22(1) (the anchor node) sees withdrawal of the originally advertised MAC-to-IP binding from leaf switch 22(2) for host 14(3), leaf switch 22(1) can stop sending the proxy route advertisement for host 14(3) (now a data plane connected host).

Figure 4:
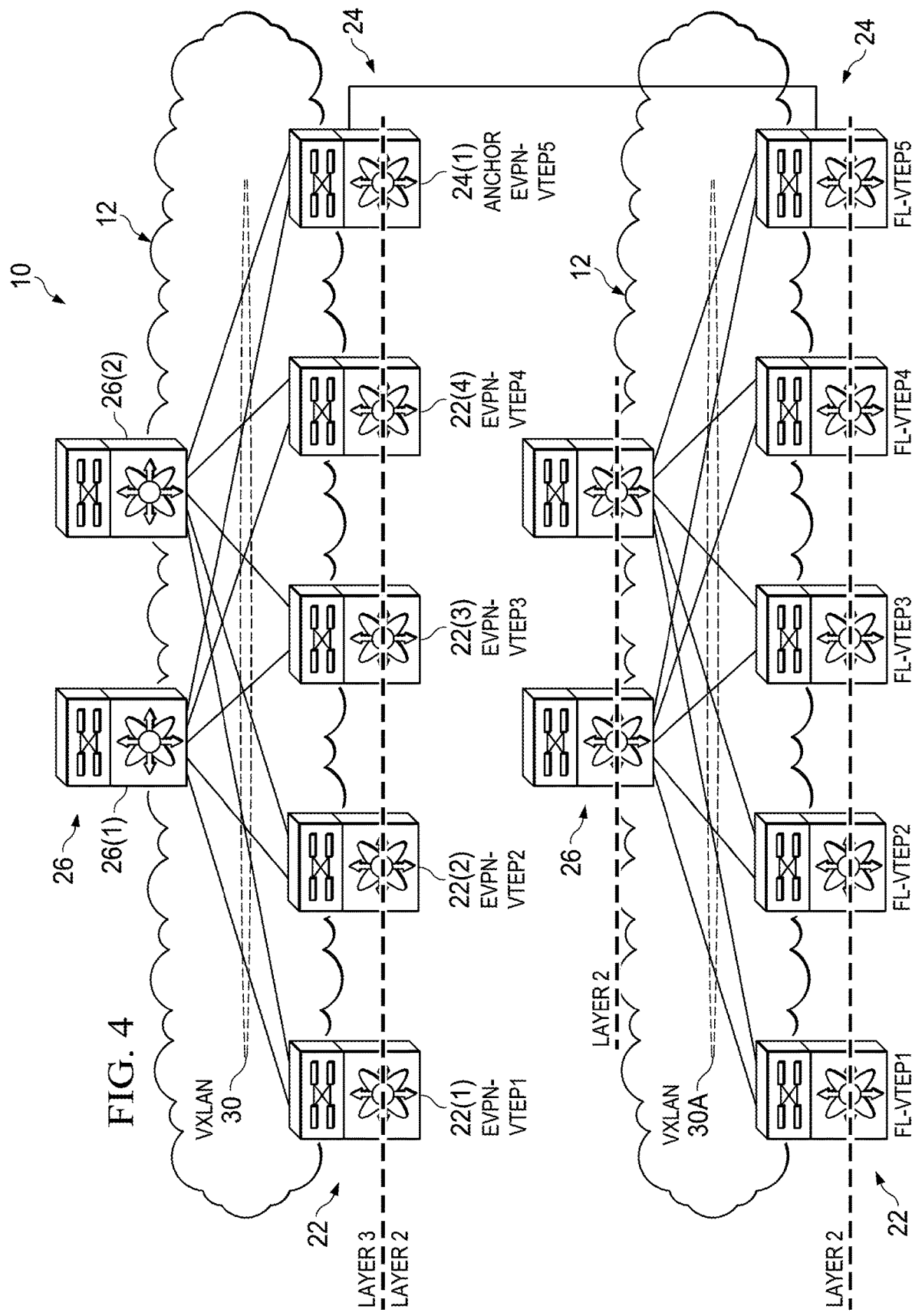
FIG. 4 is a simplified block diagram illustrating example details of the communication system in accordance with various embodiments.

Turning to FIG. 4, communication system 10 enables Layer 3 interoperability between data plane learning VTEPs and control plane learning VTEPs in different overlay networks, such as where one overlay network operates without a control plane (and thus includes only data learning VTEPs) and one overlay network operates with a control plane (and thus includes only control plane learning VTEPs). For example, in FIG. 4, overlay network 30 operates with a control plane, where all switches (leaf switches 22 and border leaf switches 24) are configured as control plane learning VTEPs. Communication system 10 further includes an overlay network 30A that is similar to overlay network 30, except overlay network 30A operates without a control plane, where all switches (leaf switches 22 and border leaf switches 24) are configured as data plane learning VTEPs. In FIG. 4, border leaf switch 24(1) serves as an anchor node for data plane learning VTEPs in overlay network 30A.

Note that though the present disclosure describes various enhancements of control plane learning VTEPs with regard to when overlay network 30 is a VXLAN network, the enhancements described herein are equally applicable to any overlay network that extends Layer 2 network traffic over Layer 3 networks. Further, note that while the present disclosure assumes that communication system 10 includes a multicast enabled underlay network (here, network 12 having an IP multicast backbone) for multicasting BUM traffic, the present disclosure contemplates other modes for transporting BUM traffic in communication system 10. In some implementations, control plane learning VTEPs and data plane learning VTEPs both use ingress replication for flooding BUM traffic to VTEPs belonging to the same VXLAN segment. In such implementations, where data plane learning VTEPs and control plane learning VTEPs belong to a given VNI, control plane learning VTEPs are statically configured with reachability information for data plane learning VTEPs in the given VNI, and data plane learning VTEPs are statically configured with reachability information for control plane learning VTEPs in the given VNI. In some implementations, communication system 10 includes a controller for performing static configuration operations. In some implementations, control plane learning VTEPs use multicasting for flooding BUM traffic, while data plane learning VTEPs use ingress replication for flooding BUM traffic. In such implementations, where data plane learning VTEPs and control plane learning VTEPs belong to a given VNI, data plane learning VTEPs are statically configured (for example, by a controller) with reachability information for control plane learning VTEPs in the given VNI, whereas control plane learning VTEPs learn reachability information for data plane learning VTEPs via multicasting as described herein. Where the controller operates with a control plane, such as the MP-BGP EVPN control plane, the controller can receive reachability information for the control plane learning VTEPs through the control plane (for example, via Route Type 3 messages). In some implementations, control plane learning VTEPs use ingress replication for flooding BUM traffic, while data plane learning VTEPs use multicasting for flooding BUM traffic. In such implementations, where data plane learning VTEPs and control plane learning VTEPs belong to a given VNI, control plane learning VTEPs are statically configured (for example, by a controller) with reachability information for data plane learning VTEPs in the given VNI, whereas data plane learning VTEPs learn reachability information for control plane learning VTEPs via multicasting as described herein. Where the controller operates with a control plane, such as the MP-BGP EVPN control plane, the controller can sends reachability information for the data plane learning VTEPs through the control plane (for example, via Route Type 3 messages) to the control plane learning VTEPs. In mixed BUM traffic mode operation (where data plane learning VTEPs use ingress replication while control plane learning VTEPs use multicasting, or vice versa), data plane learning VTEPs and/or control plane learning VTEPs are configures with a VNI to statically join a corresponding multicast group. Data plane learning VTEPs and/or control plane learning VTEPs can then each join the corresponding IP multicast group as IP hosts through IGMP, which triggers PIM signaling through network 12 for the corresponding multicast group. Alternatively, data plane learning VTEPs and/or control plane learning VTEPs join using static IGMP configuration on corresponding leaf switches 22. Further, when operating using ingress replication for BUM traffic, data plane learning VTEPs and/or control plane learning VTEPs de-encapsulate VXLAN packets designating the destination IP address as the multicast IP address, performing learning and forwarding on these VXLAN packets as long as the data plane learning VTEPs and/or control plane learning VTEPs are locally configured with the VNI.

Figure 5:
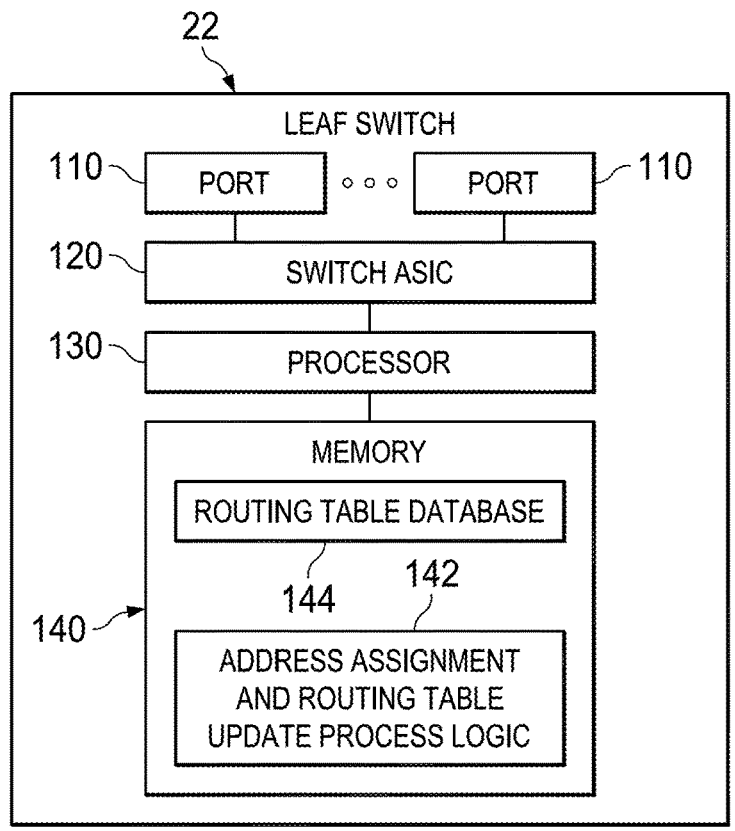
FIG. 5 is a simplified block diagram illustrating example details of the communication system in accordance with various embodiments.

Turning to FIG. 5, FIG. 5 is a simplified block diagram illustrating an exemplary leaf switch 22 configured as a control plane learning VTEP (such as leaf switch 22(1) and/or leaf switch 22(2)) that may be implemented in embodiments of communication system 10. In FIG. 5, leaf switch 22 generally includes ports 110, a switch application specific integrated circuit (ASIC) 120, a processor 130, and a memory 140. Ports 110 receive communications (for example, network traffic and/or network packets) from network elements in a network environment, such as network 12, and send communications to network elements in the network environment. Ports 110 are coupled to switch ASIC 120, which forwards network packets to an appropriate one of ports 110 for transmission to a destination network element (such as one of leaf switches 22 and/or one of hosts 14). Switch ASIC 120 is coupled to processor 130, which is configured to execute instructions (for example, software) stored in memory 140 for carrying out various network traffic management operations, such as those described herein. For example, processor 130 is configured to execute address assignment and routing table update process logic 142 to assign reachability information to network packets originating from locally attached hosts and/or received from remote hosts and/or remote VTEPs, and further configured to maintain and update a routing table database 144 that includes reachability information for locally attached hosts, remote hosts, and/or remote VTEPs. Routing table database 144 can include MAC address tables and/or VTEP ID tables, such as those described above.

Figure 6:
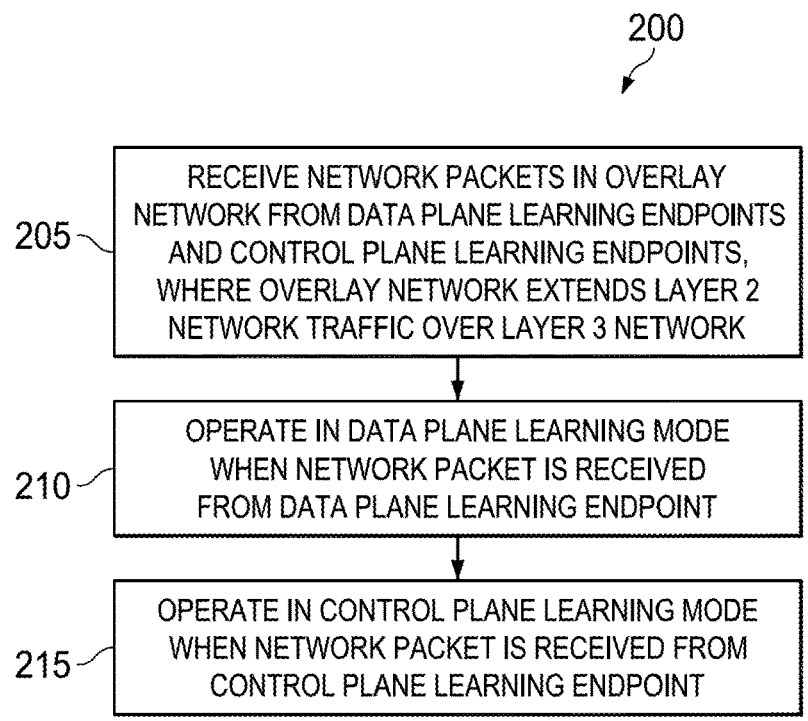
FIG. 6 is a simplified flow diagram illustrating example operations that can be associated with the communication system.

Turning to FIG. 6, FIG. 6 is a simplified flow diagram illustrating example operations 200 that may be associated with embodiments of communication system 10. In some implementations, control plane learning VTEPs, such as leaf switch 22(1) and/or leaf switch 22(2) configured as control plane learning VTEPs, perform operations 200 to enable interoperability between data plane learning endpoints and control plane learning endpoints in an overlay network environment. Operations 200 include an operation 205 where network packets are received in an overlay network from data plane learning endpoints and control plane learning endpoints. The overlay network extends Layer 2 network traffic over a Layer 3 network. For example, leaf switch 22(1) receives network packets from data plane learning endpoints (such as leaf switch 22(3) and leaf switch 22(4)) and control plane learning endpoints (such as leaf switch 22(2)). Operation 210 involves operating in a data plane learning mode when a network packet is received from a data plane learning endpoint. For example, leaf switch 22(1) operates in data plane learning mode when a network packet is received from leaf switch 22(3) or leaf switch 22(4). In some implementations, in data plane learning mode, leaf switch 22(1) de-encapsulates the network packet, performs Layer 2 (MAC) learning on the de-encapsulated network packet, and forwards the de-encapsulated network packet to its destination. Operation 215 involves operating in a control plane learning mode when the network packet is received from a control plane learning endpoint. For example, leaf switch 22(1) operates in control plane learning mode when a network packet is received from leaf switch 22(3) or leaf switch 22(4). In some implementations, in control plane learning mode, leaf switch 22(1) disables Layer 2 (MAC) learning, such that leaf switch 22(1) de-encapsulates the network packet and then forwards the de-encapsulated network packet to its destination.

In example implementations, at least some portions of the activities outlined herein may be implemented in software in, for example, leaf switches 22 (in particular, leaf switches 22 configured as control plane learning VTEPs). In some embodiments, one or more of these features may be implemented in hardware, provided external to these elements, or consolidated in any appropriate manner to achieve the intended functionality. Various network elements described herein (for example, hosts 14, leaf switches 22, border leaf switches 24, and/or spine switches 26) may include software (or reciprocating software) that can coordinate in order to achieve the operations as outlined herein. In still other embodiments, these elements may include any suitable algorithms, hardware, software, components, modules, interfaces, or objects that facilitate the operations thereof. Furthermore, hosts 14, leaf switches 22, border leaf switches 24, and/or spine switches 26 described and shown herein (and/or associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, a processor can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described herein should be construed as being encompassed within the broad term "processor."

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", "various implementations" and the like are intended to mean that any such features are included in one or more embodiments of the present disclosure, but may or may not necessarily be combined in the same embodiments.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of the communication system 10 as described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    designating a first endpoint in an overlay network as a data plane learning endpoint and a second endpoint in the overlay network as a control plane learning endpoint;
    operating in a data plane learning mode when a network packet in the overlay network is received from the data plane learning endpoint, wherein the data plane learning mode allows Layer 2 learning, and wherein the data plane learning mode is used when communicating with hosts behind the data plane learning endpoint; and
    operating in a control plane learning mode when the network packet is received from the control plane learning endpoint, wherein the control plane learning mode disables the Layer 2 learning, and wherein the control plane learning mode is used when communicating with other hosts behind the control plane learning endpoint.

2. The method of claim 1, further comprising:
    when operating in the data learning mode, processing the network packet based on outer header information and inner header information associated with the network packet.

3. The method of claim 1, further comprising:
    when operating in the control plane learning mode, processing the network packet based on inner header information associated with the network packet.

4. The method of claim 1, further comprising:
tracking, based on an endpoint identification table, a first designation of the first endpoint as the data plane learning endpoint; and
tracking, based on the endpoint identification table, a second designation of the second endpoint as the control plane learning endpoint.

5. The method of claim 4, further comprising:
receiving, from a plurality of endpoints including the first endpoint and the second endpoint, a plurality of network packets in the overlay network, the plurality of network packets including the network packet, wherein the overlay network is configured to extend Layer 2 network traffic over a Layer 3 network and operate with a plurality of learning modes, the plurality of learning modes including the data plane learning mode and the control plane learning mode.

6. The method of claim 5, wherein the endpoint identification table comprises a plurality of entries and each entry indicates one of the plurality of learning modes of one of the plurality of endpoints in the overlay network, the method further comprising:
discovering a new endpoint in the overlay network;
generating a new entry for the new endpoint in the endpoint identification table, wherein the new entry indicates the data plane learning mode for the new endpoint; and
upon receiving network traffic from the new endpoint through a control plane of the overlay network, updating the new entry for the new endpoint to indicate the control plane learning mode for the new endpoint.

7. The method of claim 1, wherein operating in the data plane learning mode when the network packet is received from the data plane learning endpoint comprises:
de-encapsulating the network packet to yield a de-encapsulated network packet;
performing Layer 2 learning on the de-encapsulated network packet; and
forwarding the de-encapsulated network packet to a destination specified in the de-encapsulated network packet.

8. The method of claim 1, further comprising:
operating at least one endpoint as an anchor node, wherein the anchor node routes inter-overlay segment traffic to and from the hosts operating behind the data plane learning endpoint, the overlay network comprising a plurality of overlay segments.

9. The method of claim 8, wherein operating as the anchor node comprises at least one of resolving address resolution protocol (ARP) requests for a default gateway from the hosts or advertising reachability information learned from the ARP requests for the hosts through a control plane of the overlay network.

10. The method of claim 1, wherein the overlay network comprises a Virtual Extensible Local Area Network (VXLAN), and wherein the data plane learning endpoint and the control plane learning endpoint comprise VXLAN tunnel endpoints (VTEPs).

11. A system comprising:
one or more processors; and
at least one non-transitory computer-readable storage medium having stored therein instructions which, when executed by the one or more processors, cause the one or more processors to:
designate a first endpoint in an overlay network as a data plane learning endpoint and a second endpoint in the overlay network as a control plane learning endpoint;
operate in a data plane learning mode when a network packet in the overlay network is received from the data plane learning endpoint, wherein the data plane learning mode allows Layer 2 learning, and wherein the data plane learning mode is used when communicating with hosts behind the data plane learning endpoint; and
operate in a control plane learning mode when the network packet is received from the control plane learning endpoint, wherein the control plane learning mode disables the Layer 2 learning, and wherein the control plane learning mode is used when communicating with other hosts behind the control plane learning endpoint.

12. The system of claim 11, the at least one non-transitory computer-readable storage medium storing instructions which, when executed by the one or more processors, cause the one or more processors to:
when operating in the data learning mode, process the network packet based on outer header information and inner header information associated with the network packet; and
when operating in the control plane learning mode, process the network packet based on inner header information associated with the network packet.

13. The system of claim 11, the at least one non-transitory computer-readable storage medium storing instructions which, when executed by the one or more processors, cause the one or more processors to:
track, based on an endpoint identification table, a first designation of the first endpoint as the data plane learning endpoint; and
track, based on the endpoint identification table, a second designation of the second endpoint as the control plane learning endpoint.

14. The system of claim 13, the at least one non-transitory computer-readable storage medium storing instructions which, when executed by the one or more processors, cause the one or more processors to:
receive, from a plurality of endpoints including the first endpoint and the second endpoint, a plurality of network packets in the overlay network, the plurality of network packets including the network packet, wherein the overlay network is configured to extend Layer 2 network traffic over a Layer 3 network and operate with a plurality of learning modes, the plurality of learning modes including the data plane learning mode and the control plane learning mode.

15. The system of claim 14, wherein the endpoint identification table comprises a plurality of entries and each entry indicates one of the plurality of learning modes of one of the plurality of endpoints in the overlay network, the at least one non-transitory computer-readable storage medium storing instructions which, when executed by the one or more processors, cause the one or more processors to:
discover a new endpoint in the overlay network;
generate a new entry for the new endpoint in the endpoint identification table, wherein the new entry indicates the data plane learning mode for the new endpoint; and
upon receiving network traffic from the new endpoint through a control plane of the overlay network, update the new entry for the new endpoint to indicate the control plane learning mode for the new endpoint.

16. The system of claim 11, wherein operating in the data plane learning mode when the network packet is received from the data plane learning endpoint comprises:
de-encapsulating the network packet to yield a de-encapsulated network packet;

performing Layer 2 learning on the de-encapsulated network packet; and forwarding the de-encapsulated network packet to a destination specified in the de-encapsulated network packet.

17. The system of claim 11, the at least one non-transitory computer-readable storage medium storing instructions which, when executed by the one or more processors, cause the one or more processors to:

operate at least one endpoint as an anchor node, wherein the anchor node routes inter-overlay segment traffic to and from the hosts operating behind the data plane learning endpoint, wherein the overlay network comprise a plurality of overlay segments, and wherein operating as the anchor node comprises at least one of resolving address resolution protocol (ARP) requests for a default gateway from the hosts or advertising reachability information learned from the ARP requests for the hosts through a control plane of the overlay network.

18. At least one non-transitory computer-readable storage medium having stored therein instructions which, when executed by one or more processors, cause the one or more processors to:

designate a first endpoint in an overlay network as a data plane learning endpoint and a second endpoint in the overlay network as a control plane learning endpoint;

operate in a data plane learning mode when a network packet in the overlay network is received from the data plane learning endpoint, wherein the data plane learning mode allows Layer 2 learning, and wherein the data plane learning mode is used when communicating with hosts behind the data plane learning endpoint; and operate in a control plane learning mode when the network packet is received from the control plane learning endpoint, wherein the control plane learning mode disables the Layer 2 learning, and wherein the control plane learning mode is used when communicating with other hosts behind the control plane learning endpoint.

19. The at least one non-transitory computer-readable storage medium of claim 18, storing additional instructions which, when executed by the one or more processors, cause the one or more processors to:

when operating in the data learning mode, process the network packet based on outer header information and inner header information associated with the network packet; and when operating in the control plane learning mode, process the network packet based on inner header information associated with the network packet.

20. The at least one non-transitory computer-readable storage medium of claim 18, storing additional instructions which, when executed by the one or more processors, cause the one or more processors to:

operate at least one endpoint as an anchor node, wherein the anchor node routes inter-overlay segment traffic to and from the hosts operating behind the data plane learning endpoint, wherein the overlay network comprise a plurality of overlay segments, and wherein operating as the anchor node comprises at least one of resolving address resolution protocol (ARP) requests for a default gateway from the hosts or advertising reachability information learned from the ARP requests for the hosts through a control plane of the overlay network.

* * * * *